United States Patent
Zhang et al.

(10) Patent No.: US 12,185,412 B2
(45) Date of Patent: Dec. 31, 2024

(54) COMMUNICATION METHOD OF SENDING POWER SAVING SIGNAL AND COMMUNICATIONS APPARATUS

(71) Applicant: HUAWEI TECHNOLOGIES CO., LTD., Guangdong (CN)

(72) Inventors: Zhanzhan Zhang, Shanghai (CN); Xiaolei Tie, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/884,842

(22) Filed: Aug. 10, 2022

(65) Prior Publication Data

US 2023/0036393 A1 Feb. 2, 2023

Related U.S. Application Data

(63) Continuation of application No. 17/513,869, filed on Oct. 28, 2021, now Pat. No. 11,445,568, which is a
(Continued)

(30) Foreign Application Priority Data

Apr. 30, 2019 (CN) .......................... 201910365288.5

(51) Int. Cl.
*H04W 24/00* (2009.01)
*H04L 5/00* (2006.01)
(Continued)

(52) U.S. Cl.
CPC ........... *H04W 76/28* (2018.02); *H04L 5/0048* (2013.01); *H04W 24/08* (2013.01); *H04W 52/0229* (2013.01)

(58) Field of Classification Search
CPC . H04W 76/28; H04W 24/08; H04W 52/0229; H04W 52/0235; H04W 52/0216;
(Continued)

(56) References Cited

U.S. PATENT DOCUMENTS 11,445,568 B2 * 9/2022 Zhang ................... H04L 5/0048
2016/0073366 A1 3/2016 Ng et al.
(Continued)

FOREIGN PATENT DOCUMENTS

CN 102638840 8/2012
CN 108632960 10/2018
(Continued)

OTHER PUBLICATIONS

MediaTek (R1-1901804, NR UE Power Saving Designs, Athens, Greece, Feb. 25-Mar. 1, 2019) (Year: 2019).*
(Continued)

*Primary Examiner* — Maharishi V Khirodhar
(74) *Attorney, Agent, or Firm* — Fish & Richardson P.C.

(57) ABSTRACT

The present disclosure relates to communication method and a communications apparatus. One example method includes determining, based on a receiving status of a first power saving signal, that a physical downlink control channel (PDCCH) is not detected within a first discontinuous reception (DRX) cycle; and performing, in a first time period within the first DRX cycle, radio resource management (RRM) measurement on a channel state information reference signal (CSI-RS) sent by a network device.

17 Claims, 8 Drawing Sheets

Related U.S. Application Data continuation of application No. PCT/CN2020/088247, filed on Apr. 30, 2020.

(51) Int. Cl.

| | |
|---|---|
| *H04L 43/0852* | (2022.01) |
| *H04L 43/50* | (2022.01) |
| *H04W 24/08* | (2009.01) |
| *H04W 52/02* | (2009.01) |
| *H04W 76/28* | (2018.01) |

(58) Field of Classification Search
CPC ......... H04W 52/0274; H04W 52/0248; H04W 72/23; H04L 5/0048; H04L 5/0053; Y02D 30/70
USPC ........................................................ 370/252
See application file for complete search history.

(56) References Cited

U.S. PATENT DOCUMENTS

| | | | |
|---|---|---|---|
| 2017/0289910 A1 | 10/2017 | Islam et al. | |
| 2020/0029315 A1* | 1/2020 | Lin | H04L 1/0075 |
| 2020/0092073 A1* | 3/2020 | Papasakellariou | H04L 5/0053 |

FOREIGN PATENT DOCUMENTS

| | | |
|---|---|---|
| CN | 109219113 | 1/2019 |
| CN | 109429310 A | 3/2019 |
| CN | 109495925 | 3/2019 |
| WO | 2018129654 | 7/2018 |
| WO | 2018204799 A1 | 11/2018 |
| WO | 2018210135 | 11/2018 |
| WO | 2019047785 A1 | 3/2019 |

OTHER PUBLICATIONS

MediaTek ( R1-1901805, Feb. 25-Mar. 1, 2019, NR RRM UE power saving, Refer to as MediaTek2). (Year: 2019).*
Oppo, "Impacts of power saving signalling to C-DRX," 3GPP TSG RAN WG2 #105bis, R2-1903296, Xi'an, China, Apr. 6-12, 2019, 5 pages.
Office Action in Japanese Appln. No. 2021-564602, mailed on Mar. 20, 2023, 10 pages (with English translation).
ZTE, "Considerations on Triggering for UE Power Saving," 3GPP TSG RAN WG1 Meeting #95, R1-1812422, Spokane, USA, Nov. 12-16, 2018, 7 pages.
Office Action in Chinese Appln. No. 201910365288.5, dated Dec. 28, 2022, 10 pages.
CMCC, "Discussion on UE power saving schemes with adaption to UE traffic," 3GPP TSG RAN WG1 #96, R1-1903344, Athens, Greece, Feb. 25-Mar. 1, 2019, 14 pages.
ZTE Corporation et al., "Clarification on CSI-RS configuration in MO," 3GPP TSG-RAN WG2 Meeting #105, R2-1900664, Athens, Greece, 4 pages.
Office Action in Japanese Appln. No. 2021-564602, dated Nov. 21, 2022, 12 pages (with English translation).
3GPP TS 38.213 V15.5.0 (Mar. 2019), "3rd Generation Partnership Project; Technical Specification Group Radio Access Network; NR; Physical layer procedures for control (Release 15)," Mar. 2019, 104 pages.
3GPP TS 38.214 V15.5.0 (Mar. 2019), "3rd Generation Partnership Project; Technical Specification Group Radio Access Network; NR; Physical layer procedures for data (Release 15)," Mar. 2019, 103 pages.
3GPP TS 38.321 V15.5.0 (Mar. 2019), "3rd Generation Partnership Project; Technical Specification Group Radio Access Network; NR; Medium Access Control (MAC) protocol specification (Release 15)," Mar. 2019, 78 pages.
3GPP TS 38.331 V15.5.1 (Apr. 2019), "3rd Generation Partnership Project; Technical Specification Group Radio Access Network; NR; Radio Resource Control (RRC) protocol specification (Release 15)," Apr. 2019, 491 pages.
Catt, "Offline Discussion on UE Power Saving Schemes," 3GPP TSG RAN WG1 Meeting #95, R1-1814327, Spokane, USA, Nov. 12-16, 2018, 5 pages.
Catt, "Summary of UE Power Saving Schemes," 3GPP TSG RAN WG1 #96, R1-1903483, Athens, Greece, Feb. 25-Mar. 1, 2019, 22 pages.
CMCC, "Discussion on power saving signal triggering UE adaptation," 3GPP TSG RAN WG1 #96bis, R1-1904738, Xi'an, China, Apr. 8-12, 2019, 7 pages.
Extended European Search Report issued in European Application No. 20798915.3 on May 16, 2022, 9 pages.
Huawei et al., "Reducing RRM measurements for UE power saving," 3GPP TSG RAN WG1 Meeting #97, R1-1907520, Reno, USA, May 13-17, 2019, 8 pages.
Intel Corporation et al., "On Potential Techniques for UE Power Saving," 3GPP TSG RAN WG1 Meeting #96, R1-1902508, Athens, Greece, Feb. 25-Mar. 1, 2019, 18 pages.
Intel Corporation, "RAN2 impacts when introducing RAN1 wake up signal/channel," 3GPP TSG RAN WG2 Meeting #105bis, R2-1904440, Xi'an, China, Apr. 8-12, 2019, 3 pages.
MediaTek Inc., "NR RRM UE Power Saving," 3GPP TSG RAN WG1 Meeting RAN1 #96, R1-1901805, Athens, Greece, Feb. 25-Mar. 1, 2019, 11 pages.
MediaTek Inc., "NR UE Power Saving Designs," 3GPP TSG RAN WG1 Meeting #96, R1-1901804, Athens, Greece, Feb. 25-Mar. 1, 2019, 28 pages.
Office Action issued in Indian Application No. 202147052521 on Jun. 7, 2022, 7 pages.
PCT International Search Report and Written Opinion issued in International Application No. PCT/CN2020/088247 on Jul. 8, 2020, 20 pages (with English translation).
Qualcomm Incorporated, "PDCCH-based power saving channel design," 3GPP TSG-RAN WG1 #96bis, R1-1905031, Xi'an, China, Apr. 8-12, 2019,13 pages.
Qualcomm Incorporated, "Potential Techniques for UE Power Saving," 3GPP TSG-RAN WG1 #96, R1-1903016, Athens, Greece, Feb. 25-Mar. 1, 2019, 33 pages.
Vivo, "UE adaptation to traffic and power consumption characteristics," 3GPP TSG RAN WG1 #96, R1-1901710, Athens, Greece, Feb. 25-Mar. 1, 2019, 13 pages.

* cited by examiner

COMMUNICATION METHOD OF SENDING POWER SAVING SIGNAL AND COMMUNICATIONS APPARATUS

CROSS-REFERENCE TO RELATED APPLICATIONS

This application is a continuation of U.S. patent application Ser. No. 17/513,869, filed on Oct. 28, 2021, which is a continuation of International Application No. PCT/CN2020/088247, filed on Apr. 30, 2020, which claims priority to Chinese Patent Application No. 201910365288.5, filed on Apr. 30, 2019. All of the afore-mentioned patent applications are hereby incorporated by reference in their entireties.

TECHNICAL FIELD

This application relates to the field of communications technologies, and in particular, to a communication method and a communications apparatus.

BACKGROUND

During communication between a terminal and a base station, to meet a mobility requirement of a communications system for the terminal, the terminal needs to perform radio resource management (radio resource management, RRM) measurement on a serving cell and a neighboring cell, so that the terminal can perform cell selection/reselection/handover in time when entering a new cell.

In a new radio access technology (new radio access technology, NR) of a 5th generation (5th generation, 5G) communications system, discontinuous reception (discontinuous reception, DRX) may be configured for a terminal in a radio resource control connected (radio resource control connected, RRC_connected) mode, to enable the terminal to enter on duration (on duration) at regular intervals to receive and send data, and to enter a sleep state at other time without monitoring a physical downlink control channel (physical downlink control channel, PDCCH). This can reduce energy consumption of the terminal.

In NR, to further reduce the energy consumption of the terminal, a new concept "power saving signal" (power saving signal) is expected to be introduced. A network device may configure a power saving signal for a terminal in a DRX state, to indicate whether the terminal needs to be waked up to monitor PDCCH within next one or more DRX cycles. The power saving signal may indicate that the terminal enters the sleep state within an entire DRX cycle. As a result, an active time (active time) of the terminal is reduced. This reduces opportunities and accuracy of RRM measurement if an existing RRM measurement mechanism is used.

Based on the foregoing analysis, on a premise that the concept "power saving signal" is introduced, a new RRM measurement mechanism urgently needs to be provided.

SUMMARY

This application provides a communication method and a communications apparatus, to ensure sufficient RRM measurement opportunities for a terminal device, ensure accuracy of RRM measurement, and prevent introduction of a concept "power saving signal" from affecting mobility RRM measurement performed by the terminal.

According to a first aspect, a communication method is provided. The method may be performed by a terminal device, or may be performed by a chip or a circuit configured in a terminal device. This is not limited in this application.

Specifically, the method includes: determining, based on a receiving status of a first power saving signal, that not to detectPDCCH within a first DRX cycle; and performing, in a first time period within the first DRX cycle, RRM measurement on a CSI-RS sent by a network device.

According to a second aspect, a communication method is provided. The method may be performed by a network device, or may be performed by a chip or a circuit configured in a network device. This is not limited in this application.

Specifically, the method includes: determining that a terminal device does not detect a PDCCH within a first DRX cycle; and sending a CSI-RS to the terminal device in a first time period within the first DRX cycle, where the CSI-RS is used by the terminal device to perform RRM measurement.

Specifically, the first DRX cycle includes the first time period. In the first time period, the network device sends at least one CSI-RS used for RRM measurement to the terminal device. The terminal device may measure the CSI-RS in the first time period. The first time period may be specified by a system or a protocol, or may be agreed on between the network device and the terminal device. For example, the network device may configure the terminal device by using semi-static signaling or dynamic signaling.

It should be understood that, in this embodiment of this application, the "protocol" may be a standard protocol in the communications field, for example, may include an LTE protocol, an NR protocol, and a related protocol applied to a future communications system. This is not limited in this application.

It may be understood that if the terminal device is in an inactive state before the first time period, the terminal device may be waked up to enter an active state to measure the CSI-RS.

Optionally, after completing RRM measurement on the CSI-RS in the first time period, the terminal device may enter the inactive state, to reduce energy consumption of the terminal device.

In this application, the first time period is set within the first DRX cycle. Even if the terminal device is indicated to enter a sleep state within the first DRX cycle, the network device still sends the CSI-RS in the first time period, and the terminal device also assumes that the CSI-RS exists in the first time period, and may perform RRM measurement on the CSI-RS in the first time period. This can ensure sufficient RRM measurement opportunities for the terminal device, ensure accuracy of RRM measurement, and prevent introduction of a concept "power saving signal" from affecting mobility RRM measurement performed by the terminal.

With reference to the first aspect or the second aspect, in some implementations, the first time period includes a part or all of on duration within the first DRX cycle.

With reference to the first aspect or the second aspect, in some implementations, the first time period includes a part or all of an opportunity for DRX within the first DRX cycle.

Optionally, the network device may send the CSI-RS in the first time period according to a sending cycle configured by the network device.

Optionally, the first DRX cycle may be any one of one or more DRX cycles indicated by the first power saving signal, for example, a first or the last DRX cycle. This is not limited in this application.

Optionally, the first time period may be any time period within the first DRX cycle, and a length of the first time period may be less than or equal to a length of the first DRX cycle and greater than or equal to any length of a time period occupied by the at least one CSI-RS.

For example, the first time period may be the on duration within the first DRX cycle.

For another example, the length of the first time period may be equal to a length of the on duration within the first DRX cycle.

For another example, the length of the first time period may be equal to the length of the first DRX cycle.

For another example, when the active state is available within the first DRX cycle, the length of the first time period may be equal to a length of an active time.

According to a third aspect, a communication method is provided. The method may be performed by a terminal device, or may be performed by a chip or a circuit configured in a terminal device. This is not limited in this application.

Specifically, the method includes: determining a first time period based on a receiving occasion of a first power saving signal; and performing, in the first time period, RRM measurement on a CSI-RS sent by a network device.

According to a fourth aspect, a communication method is provided. The method may be performed by a network device, or may be performed by a chip or a circuit configured in a network device. This is not limited in this application.

Specifically, the method includes: determining a first time period based on a sending occasion of a first power saving signal; and sending a CSI-RS to a terminal device in the first time period, where the CSI-RS is used by the terminal device for RRM measurement.

In this embodiment, the network device may preconfigure a time period #A to transmit the first power saving signal (the time period #A may also be referred to as a time period occupied by the first power saving signal). The terminal device may determine, based on a receiving status of the first power saving signal in the time period #A, whether to detect a PDCCH within at least one DRX cycle that is after the time period #A.

In this embodiment, the network device and the terminal device each may determine the first time period based on the sending occasion of the first power saving signal. The network device sends the CSI-RS in the first time period, and the terminal device may perform RRM measurement on the CSI-RS in the first time period.

In this embodiment, the associated first time period is determined based on the sending occasion of the first power saving signal. The network device may send the CSI-RS in the first time period, and the terminal device may perform RRM measurement on the CSI-RS in the first time period. This can ensure sufficient RRM measurement opportunities for the terminal device, ensure accuracy of RRM measurement, and prevent introduction of a concept "power saving signal" from affecting mobility RRM measurement performed by the terminal.

With reference to the third aspect or the fourth aspect, in some implementations, an offset value between a time period occupied by the CSI-RS and the time period occupied by the first power saving signal is less than or equal to a first duration threshold, and the time period occupied by the CSI-RS is in the first time period.

Specifically, to detect the first power saving signal, the terminal device may need to be waked up from a sleep state in the time period #A, and the time period occupied by the CSI-RS needs to be as close as possible to the time period #A. In this way, the terminal device can perform RRM measurement immediately after completing detection of the first power saving signal, and does not need to be waked up from the sleep state only for RRM measurement. In addition, the time period occupied by the CSI-RS is set to be as close as possible to the time period #A. This can also reduce a time period in which the terminal device keeps awake, and can reduce energy consumption of the terminal device.

Optionally, the offset value between the time period occupied by the CSI-RS and the time period #A may be an offset value between the first character of the time period occupied by the CSI-RS and the first or the last character of the time period #A, or may be an offset value between the last character of the time period occupied by the CSI-RS and the first or the last character of the time period #A. This is not limited in this application.

With reference to the third aspect or the fourth aspect, in some implementations, duration of the first time period may be less than or equal to a second duration threshold. A time period in which the terminal device keeps an active state for performing RRM measurement may be limited, to reduce power consumption of the terminal device.

Optionally, the duration of the first time period may be a length of DRX-on duration within a DRX cycle.

According to a fifth aspect, a communication method is provided. The method includes: a terminal device receives indication information sent by a network device, where the indication information includes first indication information and/or second indication information, the first indication information is used to indicate a possibility that the network device sends a CSI-RS within a first DRX cycle, the second indication information is used to indicate a possibility that the network device sends a CSI-RS within a second DRX cycle, and the second DRX cycle is a DRX cycle after the first DRX cycle; and the terminal device determines, based on the indication information, whether to perform RRM measurement within the first DRX cycle.

In this embodiment, whether to perform RRM measurement within the first DRX cycle can be determined based on the indication information. In this way, the terminal device can measure the CSI-RS more flexibly. The terminal device may determine, based on the indication information, whether to perform RRM measurement within the current first DRX cycle, for example, may determine, based on the indication information, not to perform RRM measurement within the first DRX cycle. This helps reduce energy consumption of the terminal device.

Optionally, the first indication information is used to indicate that the network device possibly or definitely sends the CSI-RS within the first DRX cycle.

Optionally, the second indication information is used to indicate that the network device possibly or definitely sends the CSI-RS within the second DRX cycle.

With reference to the fifth aspect, in some implementations, when the indication information includes the first indication information, that the terminal device determines, based on the indication information, whether to perform RRM measurement within the first DRX cycle includes: if the first indication information indicates that the network device definitely sends the CSI-RS within the first DRX cycle, the terminal device performs RRM measurement within the first DRX cycle.

Specifically, the first indication information indicates that the CSI-RS is definitely sent within the first DRX cycle. Because the terminal device cannot determine whether a CSI-RS is definitely available within a next DRX cycle, the terminal device may perform RRM measurement within the first DRX cycle. If the first indication information indicates that the network device possibly sends the CSI-RS within the first DRX cycle, the terminal device may or may not perform RRM measurement within the first DRX cycle.

With reference to the fifth aspect, in some implementations, when the indication information includes the second indication information, that the terminal device determines, based on the indication information, whether to perform RRM measurement within the first DRX cycle includes: if the second indication information indicates that the network device definitely sends the CSI-RS within the second DRX cycle, the terminal device does not perform RRM measurement within the first DRX cycle; or if the second indication information indicates that the network device possibly sends the CSI-RS within the second DRX cycle, the terminal device performs RRM measurement within the first DRX cycle.

Specifically, if the second indication information indicates that the network device definitely sends the CSI-RS within the second DRX cycle, RRM measurement can be inevitably performed within the second DRX cycle. In this case, the terminal device may not perform RRM measurement within the first DRX cycle, to reduce power consumption. If the second indication information indicates that the network device possibly sends the CSI-RS within the second DRX cycle, the terminal device cannot determine whether RRM measurement can be performed within the second DRX cycle. In this case, to ensure sufficient measurement samples, the terminal device performs RRM measurement within the first DRX cycle.

With reference to the fifth aspect, in some implementations, the method further includes: the terminal device determines, based on a receiving status of a power saving signal, whether to detect a PDCCH within the first DRX cycle; and that the terminal device determines, based on the indication information, whether to perform RRM measurement within the first DRX cycle includes: the terminal device determines, based on the indication information and whether to detect PDCCH within the first DRX cycle, whether to perform RRM measurement within the first DRX cycle.

With reference to the fifth aspect, in some implementations, when the indication information includes the first indication information, that the terminal device determines, based on the indication information and whether to detect PDCCH within the first DRX cycle, whether to perform RRM measurement within the first DRX cycle includes: if the first indication information indicates that the network device possibly sends the CSI-RS within the first DRX cycle, and the terminal device detects PDCCH within the first DRX cycle, the terminal device performs RRM measurement within the first DRX cycle; or if the first indication information indicates that the network device possibly sends the CSI-RS within the first DRX cycle, and the terminal device does not detect PDCCH within the first DRX cycle, the terminal device does not perform RRM measurement within the first DRX cycle.

Specifically, when the terminal device detects PDCCH within the first DRX cycle, the terminal device inevitably needs to enter an active state. In this case, that the network device possibly sends the CSI-RS within the first DRX cycle, which is indicated by the first indication information, is changed to that the network device determines to send the CSI-RS. It may be understood that, when determining that the terminal device detects PDCCH within the first DRX cycle, the network device determines to send the CSI-RS within the first DRX cycle. In this case, an indication of the first indication information may be ignored. Therefore, the terminal device may alternatively perform RRM measurement within the first DRX cycle.

However, when the terminal device does not detect PDCCH within the first DRX cycle, the terminal device does not start a drx-on duration timer, and possibly enters an inactive state. In this case, the network device possibly sends the CSI-RS within the first DRX cycle only. For example, the first indication information is represented by using one bit. When the bit is 0, it indicates that the CSI-RS is possibly sent. In this case, the network device may not send the CSI-RS within the first DRX cycle, and therefore the terminal device does not perform RRM measurement within the first DRX cycle. In addition, when the bit is 1, it indicates that the network device definitely sends the CSI-RS within the first DRX cycle. In this case, even if the terminal device does not detect PDCCH within the first DRX cycle, the terminal device may also perform RRM measurement within the first DRX cycle. Certainly, the terminal device may alternatively not perform RRM measurement within the first DRX cycle.

It may be understood that, if the network device determines that the terminal device detects PDCCH within the first DRX cycle, or the first indication information indicates that the network device definitely sends the CSI-RS within the first DRX cycle, the network device determines to send the CSI-RS within the first DRX cycle. If the network device determines that the terminal device does not detect PDCCH within the first DRX cycle, and the first indication information indicates that the network device possibly sends the CSI-RS within the first DRX cycle, the network device may not send the CSI-RS within the first DRX cycle.

With reference to the fifth aspect, in some implementations, when the indication information includes the second indication information, that the terminal device determines, based on the indication information and whether to detect PDCCH within the first DRX cycle, whether to perform RRM measurement within the first DRX cycle includes: if the second indication information indicates that the network device possibly sends the CSI-RS within the second DRX cycle, and the terminal device detects PDCCH within the first DRX cycle, the terminal device performs RRM measurement within the first DRX cycle; or if the second indication information indicates that the network device possibly sends the CSI-RS within the second DRX cycle, and the terminal device does not detect PDCCH within the first DRX cycle, the terminal device does not perform RRM measurement within the first DRX cycle.

With reference to the fifth aspect, in some implementations, when the indication information includes the first indication information and the second indication information, that the terminal device determines, based on the indication information and whether to detect PDCCH within the first DRX cycle, whether to perform RRM measurement within the first DRX cycle includes:

if the first indication information indicates that the network device possibly sends the CSI-RS within the first DRX cycle, the second indication information indicates that the network device possibly sends the CSI-RS within the second DRX cycle, and the terminal device does not detect PDCCH within the first DRX cycle, the terminal device determines that the network device does not send the CSI-RS within the first DRX cycle, and therefore the terminal device does not perform RRM measurement within the first DRX cycle;

if the first indication information indicates that the network device possibly sends the CSI-RS within the first DRX cycle, the second indication information indicates that the network device determines to send the CSI-RS within the second DRX cycle, and the terminal device does not detect PDCCH within the first DRX cycle, the terminal device determines that the network device does not send the CSI-RS within the first DRX cycle, and therefore the terminal device does not perform RRM measurement within the first DRX cycle;

if the first indication information indicates that the network device determines to send the CSI-RS within the first DRX cycle, the second indication information indicates that the network device possibly sends the CSI-RS within the second DRX cycle, and the terminal device does not detect PDCCH within the first DRX cycle, the terminal device may also perform RRM measurement within the first DRX cycle;

if the first indication information indicates that the network device possibly sends the CSI-RS within the first DRX cycle, the second indication information indicates that the network device possibly sends the CSI-RS within the second DRX cycle, and it is determined, based on the receiving status of the power saving signal, that the terminal device is waked up within the first DRX cycle, the terminal device determines that the network device sends the CSI-RS within the first DRX cycle, and therefore the terminal device may perform RRM measurement within the first DRX cycle;

if the first indication information indicates that the network device determines to send the CSI-RS within the first DRX cycle, the second indication information indicates that the network device determines to send the CSI-RS within the second DRX cycle, and it is determined, based on the receiving status of the power saving signal, that the terminal device does not detect PDCCH within the first DRX cycle, the terminal device may not perform RRM measurement within the first DRX cycle;

if the first indication information indicates that the network device possibly sends the CSI-RS within the first DRX cycle, the second indication information indicates that the network device determines to send the CSI-RS within the second DRX cycle, and it is determined, based on the receiving status of the power saving signal, that the terminal device detects PDCCH within the first DRX cycle, the terminal device determines that the network device sends the CSI-RS within the first DRX cycle, and therefore the terminal device may not perform RRM measurement within the first DRX cycle;

if the first indication information indicates that the network device determines to send the CSI-RS within the first DRX cycle, the second indication information indicates that the network device possibly sends the CSI-RS within the second DRX cycle, and it is determined, based on the receiving status of the power saving signal, that the terminal device detects PDCCH within the first DRX cycle, the terminal device may perform RRM measurement within the first DRX cycle; or if the first indication information indicates that the network device determines to send the CSI-RS within the first DRX cycle, the second indication information indicates that the network device determines to send the CSI-RS within the second DRX cycle, and it is determined, based on the receiving status of the power saving signal, that the terminal device detects PDCCH within the first DRX cycle, the terminal device may not perform RRM measurement within the first DRX cycle.

Optionally, the first indication information and the second indication information may be sent together to the terminal device, or may be sent separately.

For example, the first indication information, the second indication information, and the power saving signal are sent together to the terminal device.

For another example, the second indication information and the power saving signal are sent together to the terminal device.

With reference to the fifth aspect, in some implementations, when the indication information includes the first indication information, that the terminal device determines, based on the indication information and whether to detect PDCCH within the first DRX cycle, whether to perform RRM measurement within the first DRX cycle includes: the terminal device determines, based on the first indication information and whether to detect PDCCH within the first DRX cycle, the possibility that the network device sends the CSI-RS within the second DRX cycle; and the terminal device determines, based on the possibility that the network device sends the CSI-RS within the second DRX cycle, whether to perform RRM measurement within the first DRX cycle.

With reference to the fifth aspect, in some implementations, that the terminal device determines, based on the first indication information and whether to detect PDCCH within the first DRX cycle, the possibility that the network device sends the CSI-RS within the second DRX cycle includes: if the first indication information indicates that the network device possibly sends the CSI-RS within the first DRX cycle, and the terminal device detects PDCCH within the first DRX cycle, the terminal device determines that the network device possibly sends the CSI-RS within the second DRX cycle;

if the first indication information indicates that the network device possibly sends the CSI-RS within the first DRX cycle, and the terminal device does not detect PDCCH within the first DRX cycle, the terminal device determines that the network device definitely sends the CSI-RS within the second DRX cycle; or if the first indication information indicates that the network device definitely sends the CSI-RS within the first DRX cycle, the terminal device determines that the network device possibly sends the CSI-RS within the second DRX cycle.

With reference to the fifth aspect, in some implementations, that the terminal device determines, based on the possibility that the network device sends the CSI-RS within the second DRX cycle, whether to perform RRM measurement within the first DRX cycle includes: if the network device possibly sends the CSI-RS within the second DRX cycle, and it is determined that the terminal device detects PDCCH within the first DRX cycle, the terminal device performs RRM measurement within the first DRX cycle; or if the network device possibly sends the CSI-CS within the first DRX cycle, and it is determined that the terminal device does not detect PDCCH within the first DRX cycle, the terminal device does not perform RRM measurement within the first DRX cycle.

According to a sixth aspect, a communications apparatus is provided. The apparatus may be a terminal device or a chip in a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions. The processing unit executes the instructions stored in the storage unit, to enable the terminal device to perform the method in the first aspect, the third aspect, or the fifth aspect. When the apparatus is the chip in the terminal device, the processing unit may be a processor, and the transceiver unit may be an input/output interface, a pin, a circuit, or the like. The processing unit executes instructions stored in a storage unit, to enable the terminal device to perform the method in the first aspect, the third aspect, or the fifth aspect. The storage unit may be a storage unit (for example, a register or a cache) in the chip, or may be a storage unit (for example, a read-only memory or a random access memory) outside the chip in the terminal device.

According to a seventh aspect, a communications apparatus is provided. The apparatus may be a network device or a chip in a network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store instructions. The processing unit executes the instructions stored in the storage unit, to enable the network device to perform the method in the second aspect or the fourth aspect. When the apparatus is the chip in the network device, the processing unit may be a processor, and the transceiver unit may be an input/output interface, a pin, a circuit, or the like. The processing unit executes instructions stored in a storage unit, to enable the network device to perform the method in the second aspect or the fourth aspect. The storage unit may be a storage unit (for example, a register or a cache) in the chip, or may be a storage unit (for example, a read-only memory or a random access memory) outside the chip in the network device.

According to an eighth aspect, a computer program product is provided. The computer program product includes computer program code. When the computer program code is run on a computer, the computer is enabled to perform the methods in the foregoing aspects.

It should be noted that all or some of the foregoing computer program code may be stored in a first storage medium. The first storage medium may be encapsulated together with a processor, or may be encapsulated separately from the processor. This is not specifically limited in this embodiment of this application.

According to a ninth aspect, a computer-readable medium is provided. The computer-readable medium stores program code. When the computer program code is run on a computer, the computer is enabled to perform the methods in the foregoing aspects.

DESCRIPTION OF EMBODIMENTS

The following describes the technical solutions of this application with reference to the accompanying drawings.

The technical solutions in the embodiments of this application may be applied to various communications systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a 5th generation (5th generation, 5G) communications system, or a future new radio access technology.

Figure 1:
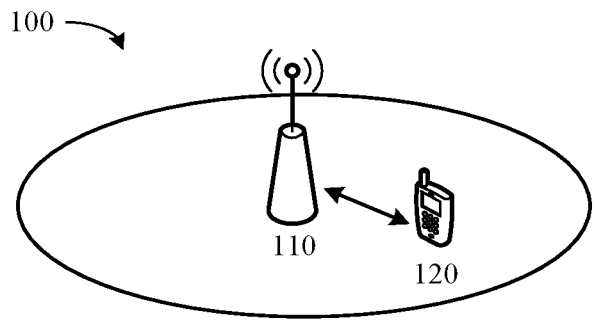
FIG. 1 is a schematic diagram of a communications system applicable to embodiments of this application.

For ease of understanding the embodiments of this application, a communications system applicable to the embodiments of this application is first described in detail with reference to FIG. 1. FIG. 1 is a schematic diagram of a communications system applicable to the embodiments of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. A plurality of antennas may be configured for each communications device such as the network device 110 or the terminal device 120. The plurality of antennas may include at least one transmit antenna configured to send a signal and at least one receive antenna configured to receive a signal. In addition, each communications device may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 110 and the terminal device 120 may communicate with each other by using a multi-antenna technology.

It should be understood that the network device in the wireless communications system may be any device that has a wireless transceiver function. The device includes but is not limited to an evolved NodeB (evolved NodeB, eNB or eNodeB), a radio network controller (radio network controller, RNC), a NodeB (Node B, NB), a base station controller (base station controller, BSC), a base transceiver station (base transceiver station, BTS), a home NodeB (for example, a home evolved NodeB, or a home Node B, HNB), a base band unit (base band unit, BBU), an access point (access point, AP) in a wireless fidelity (wireless fidelity, WIFI) system, a wireless relay node, a wireless backhaul node, a transmission point (transmission point, TP), a transmission and reception point (transmission and reception point, TRP), and the like. Alternatively, the device may be a gNB or a transmission point in a 5G system such as an NR system, may be one antenna panel or a group (including a plurality of antenna panels) of antenna panels of a base station in a 5G system, or may be a network node, such as a base band unit (BBU) or a distributed unit (distributed unit, DU), that constitute a gNB or a transmission point.

In some deployments, the gNB may include a centralized unit (centralized unit, CU) and the DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be a network device in an access network (radio access network, RAN), or may be a network device in a core network (core network, CN). This is not limited in this application.

It should be further understood that the terminal device in the wireless communications system may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (pad), a computer having the wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application.

To facilitate understanding of the embodiments of this application, related technical content in this application is briefly described first.

1. Radio Resource Management Measurement

Radio resource management (radio resource management, RRM) measurement is communication quality measurement performed by a terminal on a periodic signal. For example, content to be measured may include at least one of a received signal power (reference signal receiving power, RSRP), received signal quality (reference signal receiving quality, RSRQ), or a signal to interference plus noise ratio (signal to interference plus noise, SINR).

RRM measurement is performed to enable a terminal in a radio resource control idle (radio resource control idle, RRC idle) mode and a terminal in a radio resource control inactive (radio resource control inactive, RRC inactive) mode to perform cell selection/reselection (cell selection/reselection), and to enable a terminal in an RRC connected mode to perform cell handover. RRM measurement is performed to satisfy a requirement of a communications system for terminal mobility, to enable the terminal to perform cell selection/reselection/handover in time when entering a new cell. Therefore, RRM measurement is periodically performed.

Currently, there are mainly two types of reference signals used for RRM measurement: a synchronization signal/physical broadcast channel block (synchronization signal/physical broadcast channel block, SSB), specifically a secondary synchronization signal (secondary synchronization signal) in the SSB, and a channel state information reference signal (channel state information reference signal, CSI-RS). The SSB is a cell-level signal and can be used by the terminal in the RRC idle/inactive/connected mode. However, currently, the CSI-RS can be used only by the terminal in the RRC connected mode. When the terminal is in the RRC connected mode, a base station configures, by using RRC signaling, a specific CSI-RS resource for mobility RRM measurement. In the RRC connected mode, a specific signal used for RRM measurement (which may be based on two signals at the same time) is configured by using the RRC signaling. The embodiments of this application are mainly for the RRC connected mode, and are mainly for RRM measurement based on the CSI-RS.

2. Discontinuous Reception

Generally, a packet-based data stream is usually bursty. There is data transmitted in a time period, but there is no data transmitted in a next relatively long time period. Therefore, in NR, a discontinuous reception (discontinuous reception, DRX) processing procedure may be configured for a terminal device. When there is no data transmitted, the terminal device may be enabled to stop detecting a PDCCH and stop receiving corresponding transmitted data, to reduce power consumption and increase a battery lifespan.

Figure 2:
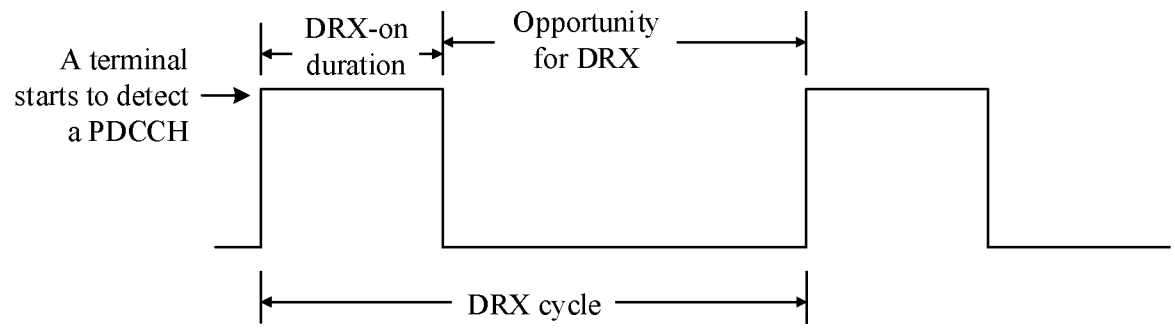
FIG. 2 is a schematic diagram of a DRX cycle.

A network device may configure a DRX cycle (DRX cycle) for a terminal device in an RRC connected mode. FIG. 2 is a schematic diagram of a DRX cycle. The DRX cycle includes a "on duration" ("On duration") time zone. Within on duration, the terminal device may detect PDCCH. The on duration is followed by an "opportunity for DRX" (Opportunity for DRX). The on duration and the opportunity for DRX together constitute the complete DRX cycle.

The terminal device starts a timer at a time start position (namely, a start position of on duration) of each DRX cycle. A time length of the timer is a time length of the on duration. The timer may be referred to as a drx-on duration timer (drx-on duration timer). The terminal device may detect PDCCH within a time range of the timer. If no PDCCH is detected by the terminal device within the time range of the drx-on duration timer, the terminal device enters a sleep state after the timer expires. In other words, the terminal device may stop detecting PDCCH in a remaining time period within the DRX cycle. In this way, a receiver circuit may be disabled, to reduce power consumption of the terminal. If the terminal device detects, within the time range of the drx-on duration timer, that a PDCCH indicates new data transmission, the terminal device starts a drx-inactivity timer (drx-inactivity timer) in a DRX mechanism. If the terminal device also detects, within a running time of the drx-inactivity timer, that a PDCCH indicates new data transmission, the terminal device restarts (restart) the drx-inactivity timer to restart counting. If the drx-inactivity timer is running, even if the originally configured drx-on duration timer expires (in other words, the on duration ends), the terminal device still needs to continue to detect PDCCH until the drx-inactivity timer expires.

There are some other timers in the DRX mechanism, for example, a DRX downlink retransmission timer (drx-retransmission timer DL) and a DRX uplink retransmission timer (drx-retransmission timer UL). The two timers are not described in detail in the technical solutions of this application.

When DRX is configured, a DRX active (DRX active) state and a DRX inactive (DRX non-active) state may be configured for the terminal. A time period in which the UE is in the DRX active state is referred to as an active time (active time). If any one of the foregoing timers (including the drx-on duration timer, the drx-inactivity timer, the downlink/uplink retransmission timer, and the like) is running, the terminal device is in the active time (in other words, the terminal is in the active state). In the DRX mechanism, if the terminal device is in the active time, the terminal device needs to detect PDCCH. It should be understood that the terminal device may also be in the active time under some other conditions. However, these conditions are seldom used in the embodiments of this application, and therefore are not described herein.

3. Power Saving Signal

Figure 3:
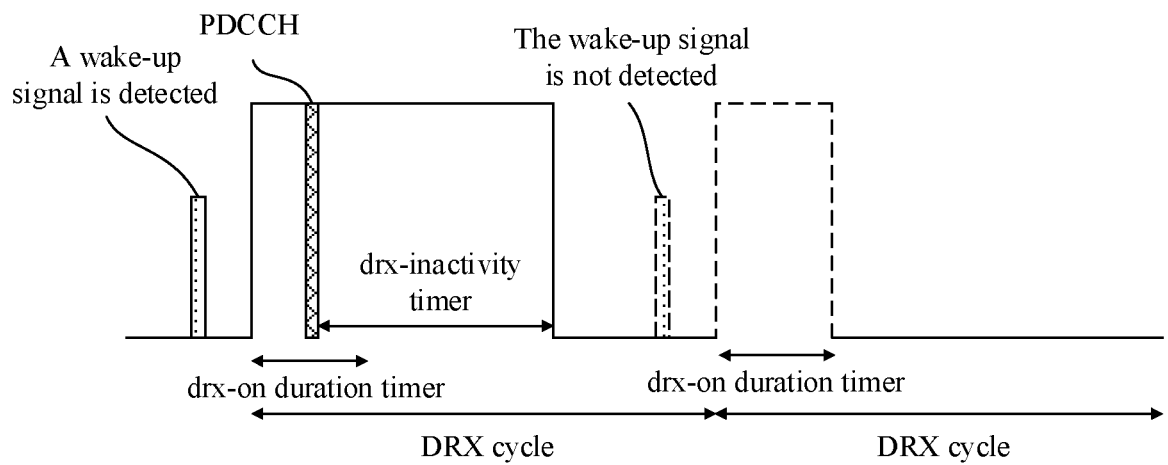
FIG. 3 is a schematic diagram of indicating, by a wake-up signal, a terminal in a DRX state.

In NR, to further reduce energy consumption of a terminal, a new concept "power saving signal" (power saving signal) is expected to be introduced. A network device may configure a power saving signal for a terminal in a DRX state. It is usually considered that the power saving signal is sent before a DRX cycle and is used to indicate whether the terminal needs to be waked up to monitor a PDCCH in next one or more DRX cycles. The power saving signal may be based on PDCCH channel. Based on different functions, the power saving signal may be classified into a wake-up signal (wake-up signal, WUS) and/or a go to sleep signal (go to sleep signal, GTS). The following describes three manners of configuring the power saving signal:

(1) The power saving signal is the wake-up signal. In this case, the terminal may determine, based on whether the wake-up signal is detected, whether to be waked up to enter on duration of the DRX cycle to detect PDCCH. FIG. 3 is a schematic diagram of indicating, by a wake-up signal, a terminal in a DRX state.

As shown in FIG. 3, if the wake-up signal is detected by the terminal before the first DRX cycle, the terminal may start a drx-on duration timer to enter on duration to detect a PDCCH. Further, if the terminal detects that a PDCCH indicates new data transmission, the terminal may start a drx-inactivity timer. However, if the wake-up signal is not detected at a preset time domain position within the first DRX cycle and before the second DRX cycle, the terminal does not need to detect PDCCH within the second DRX cycle. In this way, the terminal device may not start the drx-on duration timer and enters a sleep state, to reduce power consumption of the terminal.

(2) The power saving signal is the go to sleep signal. In this case, the terminal may determine, based on whether the go to sleep signal is detected, whether to be waked up to enter on duration of the DRX cycle to detect PDCCH. Specifically, if the go to sleep signal is detected by the terminal device, the terminal device does not start a drx-on duration timer and enters a sleep state; or if the go to sleep signal is not detected by the terminal device, the terminal device starts a drx-on duration timer and enters the on duration to detect PDCCH.

(3) The power saving signal is both the wake-up signal and the go to sleep signal. For example, one bit in downlink control information (downlink control information, DCI) may be used to indicate the terminal to be waked up to enter on duration to detect PDCCH, or to indicate the terminal not to be waked up but to enter a sleep state.

It should be understood that the foregoing radio resource management measurement, discontinuous reception, power saving signal, and the like are described to facilitate understanding of the embodiments of this application, but do not constitute any limitation on this application. Based on the foregoing descriptions, the following describes a mechanism for RRM measurement between a terminal and a base station in the prior art when discontinuous reception is configured for the terminal.

In the prior art, if DRX is configured for a terminal, and a DRX cycle in use is greater than 80 ms, the terminal expects to receive, only in an active time within the DRX cycle, a CSI-RS used for mobility RRM measurement. This means that, in the active time within the DRX cycle, a base station needs to send the CSI-RS used for RRM measurement. However, in a sleep time within the DRX cycle, the terminal does not expect the CSI-RS (the terminal is not waked up to receive the CSI-RS), and therefore the base station may choose to send or not to send the CSI-RS used for RRM measurement.

When the DRX cycle is less than or equal to 80 ms, regardless of whether the terminal is in the DRX active time or the DRX sleep time, the base station needs to send the CSI-RS used for RRM measurement, and the terminal also considers that the CSI-RS always exists. Therefore, the terminal may perform RRM measurement based on the CSI-RS.

With introduction of the concept "power saving signal", if the power saving signal indicates that the sleep state is available (or not detect PDCCH) within the DRX cycle, the terminal does not start the drx-on duration timer, and does not enter the active time within this cycle. As a result, the active time of the terminal is reduced (before the power saving signal is introduced, the active time includes at least on duration within each cycle). According to an existing RRM measurement mechanism, because the active time of the terminal is reduced, RRM measurement opportunities are reduced, and even the terminal cannot perform measurement in an entire RRM measurement cycle. Consequently, a quantity of layer 1 filtering (Layer 1 filtering) samples used by the terminal to perform RRM measurement is reduced, and accuracy of RRM measurement is reduced. This seriously affects mobility.

Based on the foregoing analysis, on a premise that the concept "power saving signal" is introduced, a new RRM measurement mechanism urgently needs to be provided.

This application provides a communication method 200, to ensure sufficient RRM measurement opportunities for a terminal and prevent introduction of a concept "power saving signal" from affecting mobility RRM measurement performed by the terminal. The following provides description with reference to FIG. 4.

Figure 4:
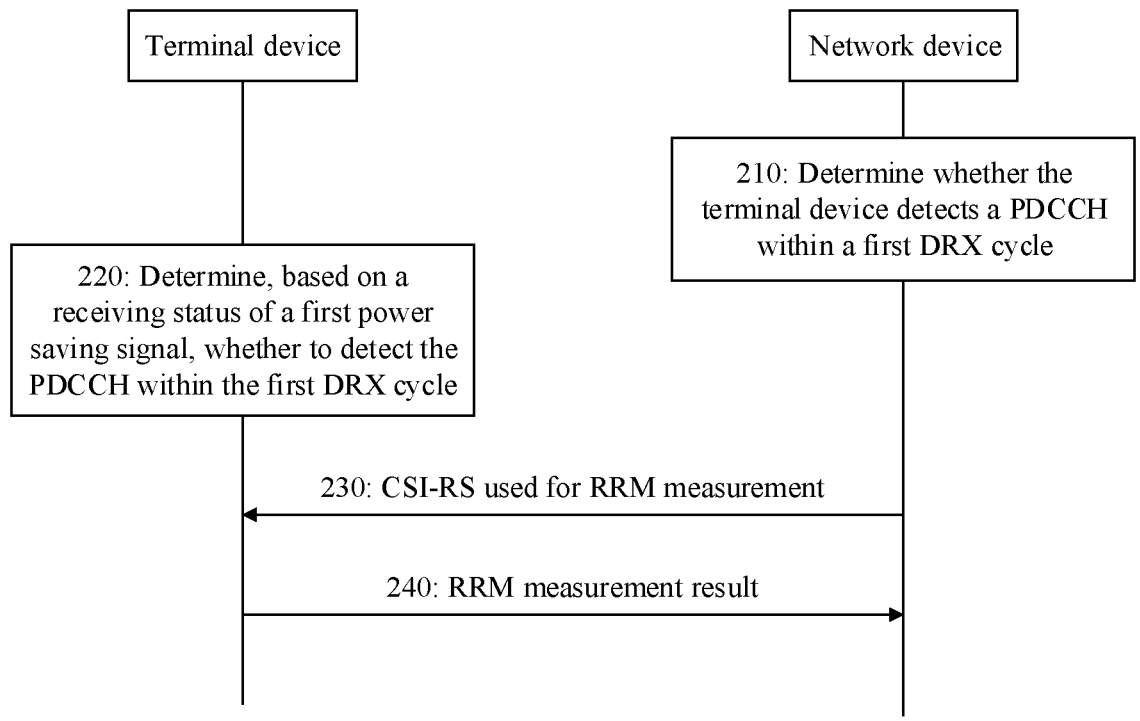
FIG. 4 is a schematic flowchart of an example of a communication method according to this application.

FIG. 4 is a schematic flowchart of the communication method 200 according to an embodiment of this application. The method 200 shown in FIG. 4 includes steps 210 to 240.

Step 210: A network device determines whether a terminal device detects PDCCH within a first DRX cycle.

Step 220: The terminal device determines, based on a receiving status of a first power saving signal, whether to detect PDCCH within the first DRX cycle.

Step 230: The network device sends a CSI-RS to the terminal device in a first time period within the first DRX cycle, where the CSI-RS is used by the terminal device to perform RRM measurement.

Correspondingly in the step 230, the terminal device performs, in the first time period within the first DRX cycle, RRM measurement on the CSI-RS sent by the network device.

Specifically, the network device may first determine whether the terminal device detects PDCCH within the first DRX cycle, in other words, the network device may first determine whether the terminal device enters an active state or an inactive state within the first DRX cycle, and may correspondingly indicate the terminal device based on a sending status of the first power saving signal. The terminal device may determine, based on the receiving status of the first power saving signal, whether to detect PDCCH within the first DRX cycle.

For example, a time period #A (for example, at least one symbol (symbol) or at least one slot (slot)) before the first DRX cycle may be preconfigured to transmit the first power saving signal. The terminal device may determine, based on the receiving status of the first power saving signal in the time period #A, whether to detect PDCCH within the first DRX cycle.

Based on the foregoing descriptions about the power saving signal, that the terminal device determines, based on a receiving status of a first power saving signal, whether to detect PDCCH within the first DRX cycle may include the following three cases:

Case a: the first power saving signal is a wake-up signal WUS. The wake-up signal WUS may be detected in the time period #A, and whether the terminal device detects PDCCH within the first DRX cycle is determined based on whether the wake-up signal WUS is detected. For example, if the wake-up signal WUS is detected by the terminal device in the time period #A, the terminal device may start a drx-on duration timer within the first DRX cycle to enter on duration to detect PDCCH. For another example, if the wake-up signal WUS is not detected by the terminal device in the time period #A, the terminal device may not start the drx-on duration timer, and does not detect PDCCH. In this case, the terminal device enters the inactive state within the first DRX cycle.

Case b: The first power saving signal is a go to sleep signal GTS. The go to sleep signal GTS may be detected in the time period #A, and whether the terminal device detects PDCCH within the first DRX cycle is determined based on whether the go to sleep signal GTS is detected. For example, if the go to sleep signal GTS is not detected by the terminal device in the time period #A, the terminal device may start a drx-on duration timer within the first DRX cycle to enter on duration to detect PDCCH. For another example, if the go to sleep signal GTS is detected by the terminal device in the time period #A, the terminal device may not start the drx-on duration timer, and does not detect PDCCH. In this case, the terminal device enters the inactive state within the first DRX cycle.

Case c: The first power saving signal is both a wake-up signal WUS and a go to sleep signal GTS. The terminal device may receive the first power saving signal in the time period #A, read content of the first power saving signal, and determine, based on the content, whether to detect PDCCH within the first DRX cycle.

For example, the following may be specified by a system or a protocol, or may be agreed on by the network device and the terminal device: one bit "0" may be used to indicate that the terminal device does not detect PDCCH, and one bit "1" may be used to indicate that the terminal device detects PDCCH. When the content of the first power saving signal is the bit "0", the terminal device can determine not to detect PDCCH within the first DRX cycle. When the content of the first power saving signal is the bit "1", the terminal device can determine to detect PDCCH within the first DRX cycle.

In this embodiment, the first DRX cycle includes the first time period. In the first time period, the network device may send at least one CSI-RS used for RRM measurement to the terminal device. The terminal device may measure the CSI-RS in the first time period.

The first time period may be specified by the system or the protocol, or may be agreed on between the network device and the terminal device. For example, the network device may configure the terminal device by using semi-static signaling or dynamic signaling. The semi-static signaling may be, for example, RRC signaling. The dynamic signaling may be, for example, a MAC control element (MAC control element, MAC CE) or DCI.

It should be understood that, in this embodiment of this application, the "protocol" may be a standard protocol in the communications field, for example, may include an LTE protocol, an NR protocol, and a related protocol applied to a future communications system. This is not limited in this application.

It may be understood that if the terminal device is in the inactive state before the first time period, the terminal device may wake up to enter the active state to measure the CSI-RS.

Optionally, after completing RRM measurement on the CSI-RS in the first time period, the terminal device may enter the inactive state, to reduce energy consumption of the terminal device.

Optionally, the network device may send the CSI-RS at a time other than the first time period within the first DRX cycle.

Optionally, the network device does not send the CSI-RS at the time other than the first time period within the first DRX cycle, to reduce energy consumption of the network device.

Optionally, the network device may send the CSI-RS in the first time period according to a sending cycle configured by the network device.

Optionally, the first DRX cycle may be any one of one or more DRX cycles indicated by the first power saving signal, for example, the first or the last DRX cycle. This is not limited in this application.

In this embodiment, the first time period is within the first DRX cycle, and a length of the first time period may be less than or equal to a length of the first DRX cycle and the length of the first time period may be greater than or equal to a time period occupied by the at least one CSI-RS.

For example, the first time period includes a part or all of the on duration within the first DRX cycle.

For another example, the first time period includes a part or all of an opportunity for DRX within the first DRX cycle.

For another example, the first time period may be the on duration within the first DRX cycle.

For another example, the length of the first time period may be equal to a length of the on duration within the first DRX cycle.

For another example, the length of the first time period may be equal to the length of the first DRX cycle.

For another example, when the active state is available within the first DRX cycle, the length of the first time period may be equal to a length of an active time.

The following describes possible setting manners of the first time period in the embodiments of this application with reference to accompanying drawings.

Manner 1

Figure 5:
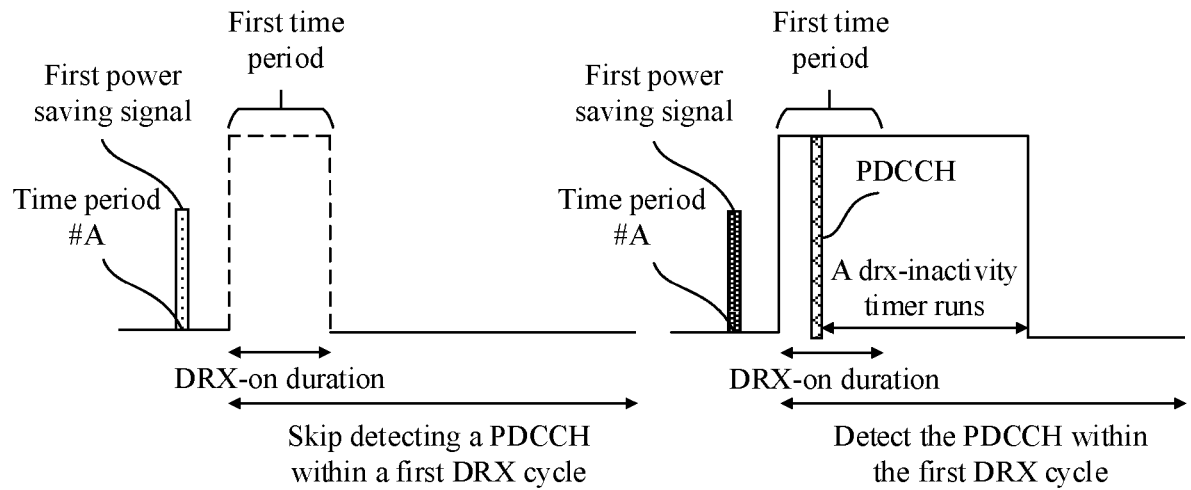
FIG. 5 is a schematic diagram of an example of a setting manner of a first time period.

FIG. 5 is a schematic diagram of an example of a setting manner of a first time period. In FIG. 5, a network device may send a first power saving signal to a terminal device in a time period #A. The first power saving signal may be used to indicate the terminal device not to detect PDCCH (left figure) or to detect PDCCH (right figure) within a first DRX cycle. In the manner 1, regardless of whether it is determined, based on sending and receiving statuses of the first power saving signal, that the terminal device does not detect or detects PDCCH within the first DRX cycle, the first time period is on duration within the first DRX cycle. In other words, a start position and an end position of the first time period are the same as those of the on duration, in other words, the first time period completely overlaps the on duration.

Manner 2

Figure 6:
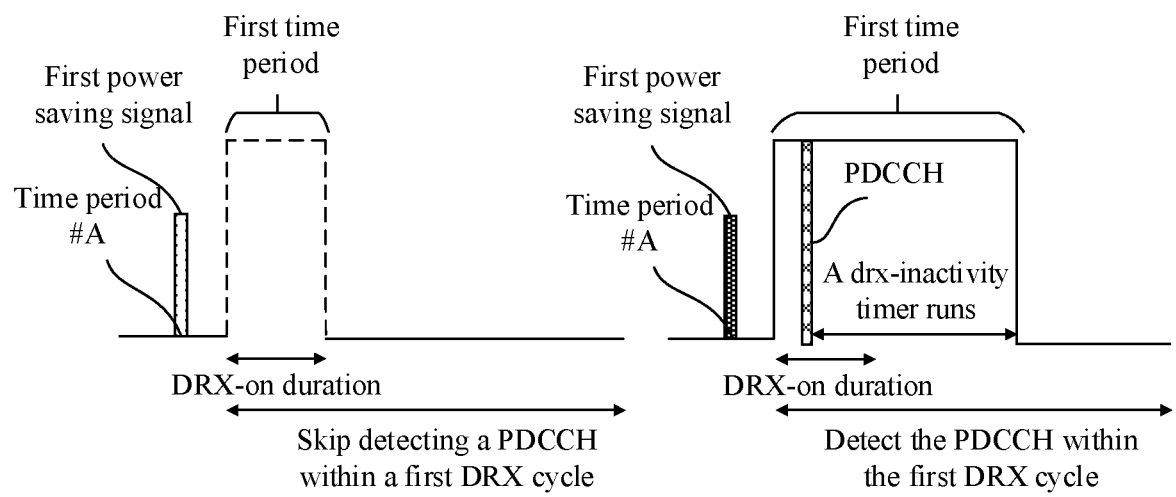
FIG. 6 is a schematic diagram of another example of a setting manner of a first time period.

FIG. 6 is a schematic diagram of another example of a setting manner of a first time period. In FIG. 6, if it is determined, based on sending and receiving statuses of a first power saving signal, that a terminal device does not detect PDCCH within a first DRX cycle (left figure), the first time period is on duration within the DRX cycle.

If it is determined, based on the sending and receiving statuses of the first power saving signal, that the terminal device detects PDCCH within the first DRX cycle (right figure), the first time period is an active time within the DRX cycle. It is easy to understand that when the terminal device enters an active state within the first DRX cycle, the active time within the first DRX cycle includes at least the on duration. If it is detected, within the on duration, that a PDCCH indicates new data transmission, the active time further needs to include a running time of a drx-inactivity timer.

Manner 3

Figure 7:
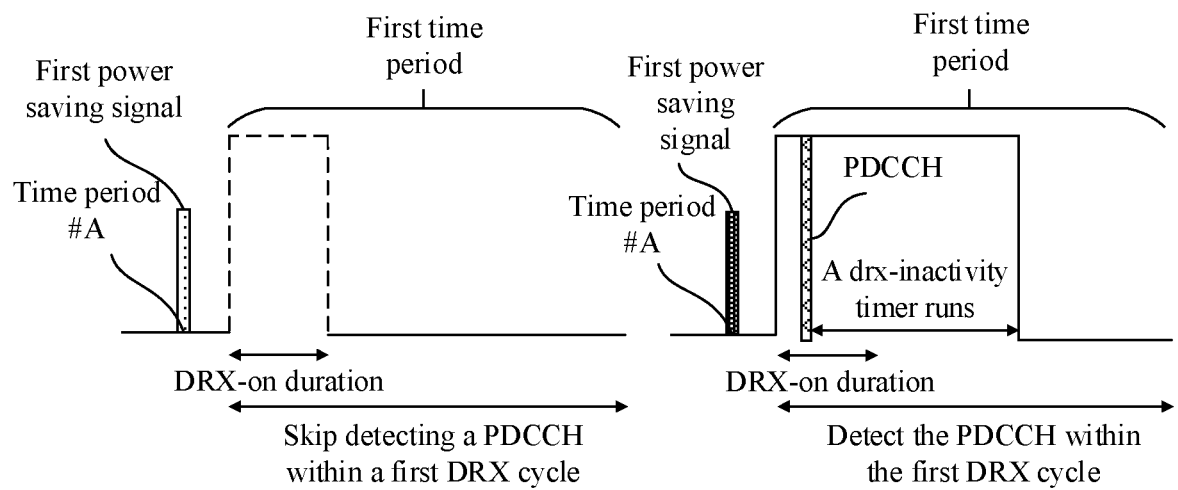
FIG. 7 is a schematic diagram of still another example of a setting manner of a first time period.

FIG. 7 is a schematic diagram of still another example of a setting manner of a first time period. In FIG. 7, when a length of a first DRX cycle is less than a duration threshold, regardless of whether it is determined, based on sending and receiving statuses of a first power saving signal, that a terminal device does not detect PDCCH (left figure) or detects PDCCH (right figure) within the first DRX cycle, the first time period is the entire first DRX cycle. In other words, a start position and an end position of the first time period are the same as those of one DRX cycle, in other words, the first time period completely overlaps the DRX cycle.

The duration threshold may be specified by a system or a protocol, or may be agreed on between a network device and the terminal device. For example, the duration threshold is 80 milliseconds (ms).

Step 240: The terminal device sends an RRM measurement result to the network device.

Correspondingly, in the step 240, the network device receives the RRM measurement result sent by the terminal device.

Specifically, after completing measurement on the CSI-RS, the terminal device may report the RRM measurement result to the network device in time. In this way, the network device may perform an operation such as cell selection/reselection/handover on the terminal device based on the measurement result.

In this embodiment of this application, the first time period is set within the first DRX cycle. Even if the terminal device is indicated to enter a sleep state within the first DRX cycle, the network device still sends the CSI-RS in the first time period, and the terminal device also assumes that the CSI-RS exists in the first time period, and may perform RRM measurement on the CSI-RS in the first time period. This can ensure sufficient RRM measurement opportunities for the terminal device, ensure accuracy of RRM measurement, and prevent introduction of a concept "power saving signal" from affecting mobility RRM measurement performed by the terminal.

This application further provides a communication method 300, to ensure sufficient RRM measurement opportunities for a terminal and prevent introduction of a concept "power saving signal" from affecting mobility RRM measurement performed by the terminal. The following provides description with reference to FIG. 8.

Figure 8:
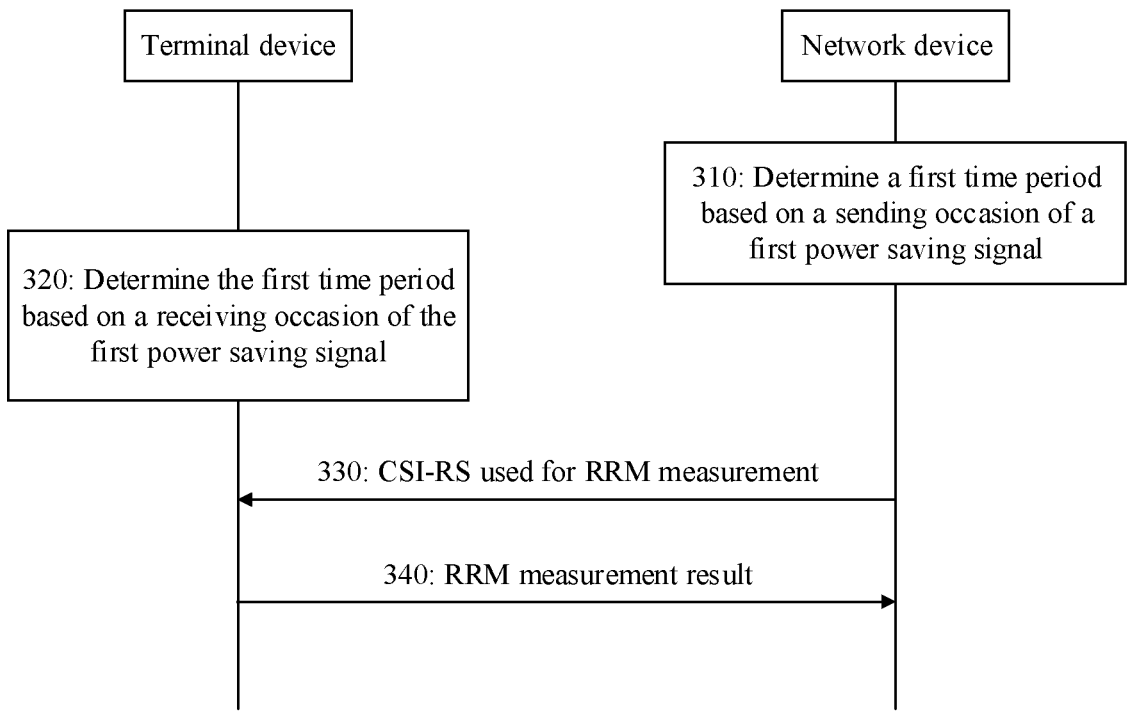
FIG. 8 is a schematic flowchart of another example of a communication method according to this application.

FIG. 8 is a schematic flowchart of the communication method 300 according to an embodiment of this application. The method 300 shown in FIG. 8 includes steps 310 to 340.

Step 310: A network device determines a first time period based on a sending occasion of a first power saving signal.

Step 320: A terminal device determines the first time period based on a receiving occasion of the first power saving signal.

Step 330: The network device sends a CSI-RS to the terminal device in the first time period, where the CSI-RS is used by the terminal device to perform RRM measurement.

Correspondingly, in the step 330, the terminal device performs, in the first time period, RRM measurement on the CSI-RS sent by the network device.

Refer to the foregoing related descriptions. The network device may preconfigure a time period #A to transmit the first power saving signal (the time period #A may also be referred to as a time period occupied by the first power saving signal). The terminal device may determine, based on a receiving status of the first power saving signal in the time period #A, whether to detect a PDCCH within at least one DRX cycle that is after the time period #A.

This embodiment is different from the foregoing embodiment in that the network device and the terminal device each may determine the first time period based on the sending occasion of the first power saving signal. The network device sends the CSI-RS in the first time period, and the terminal device may perform RRM measurement on the CSI-RS in the first time period.

In this embodiment, the first time period may be determined based on the sending occasion of the first power saving signal in the following two manners:

Manner A

When the first power saving signal is configured, the CSI-RS associated with the first power saving signal may be configured.

Specifically, when a time domain position of transmitting the first power saving signal (namely, the time period #A) is configured, a time domain position of transmitting the CSI-RS (namely, a time period occupied by the CSI-RS)

may also be configured, and the first time period is determined based on the time period occupied by the CSI-RS. It is easy to understand that the first time period needs to include the time period occupied by the CSI-RS.

Optionally, a length of the first time period may be greater than a length of the time period occupied by the CSI-RS.

Optionally, the length of the first time period may alternatively be equal to the length of the time period occupied by the CSI-RS. In this case, the first time period is the time period occupied by the CSI-RS.

In each cycle, relative positions of the time period #A and the time period occupied by the CSI-RS are fixed. The terminal device and the network device can determine a specific position of the first time period based on related configuration information and a time domain position of the time period #A. In addition, the CSI-RS is sent/measured in the first time period. For example, a method for determining, by a network, the time period occupied by the CSI-RS is: configuring an offset value between the time period occupied by the CSI-RS and the time period #A.

Usually, the time period #A occupied by the first power saving signal is periodically configured. Therefore, the configured CSI-RS is also periodic. The network device may periodically send the CSI-RS in the first time period, and the terminal device may periodically perform RRM measurement in the first time period.

Figure 9:
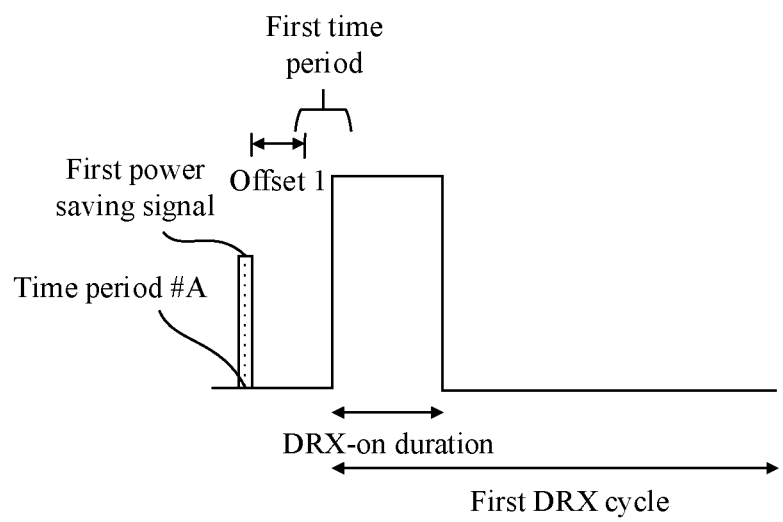
FIG. 9 is a schematic diagram of still another example of a setting manner of a first time period.

FIG. 9 is a schematic diagram of still another example of a setting manner of a first time period. As shown in FIG. 9, an offset value between a time period occupied by a CSI-RS and a time period #A is an offset 1. Optionally, a protocol may specify that the offset 1 is less than or equal to a first duration threshold.

Specifically, to detect a first power saving signal, a terminal device may need to be waked up from a sleep state in the time period #A, and the time period occupied by the CSI-RS needs to be as close as possible to the time period #A. In this way, the terminal device can perform RRM measurement immediately after completing detection of the first power saving signal, and does not need to be waked up from the sleep state only for RRM measurement. In addition, the time period occupied by the CSI-RS is set to be as close as possible to the time period #A. This can also reduce a time period in which the terminal device keeps awake, and can reduce energy consumption of the terminal device.

Optionally, the protocol may specify that the offset 1 is less than or equal to the first duration threshold. When the protocol specifies the first duration threshold, a base station needs to ensure that the offset value offset 1 between the time period #A and the time period that is occupied by the CSI-RS and that is configured by associating with the time period #A is less than or equal to the first duration threshold. If the protocol does not specify that the offset 1 is less than or equal to the first duration threshold, the time period occupied by the configured CSI-RS is configured to be as close as possible to the time period #A depending on implementation of the base station.

Optionally, the offset value offset 1 between the time period occupied by the CSI-RS and the time period #A may be an offset value between the first character of the time period occupied by the CSI-RS and the first or the last character of the time period #A, or may be an offset value between the last character of the time period occupied by the CSI-RS and the first or the last character of the time period #A. This is not limited in this application.

Optionally, in FIG. 9, a difference from the foregoing embodiment is that the first time period may be within on duration within a first DRX cycle, or may be beyond a first DRX cycle.

Manner B

When the first power saving signal is configured, the first time period associated with the first power saving signal may be directly configured.

The first time period is associated with the time period #A occupied by the first power saving signal. The network device and the terminal device each may determine the first time period based on the sending occasion of the first power saving signal. The network device sends the CSI-RS in the first time period, and the terminal device may perform RRM measurement on the CSI-RS in the first time period.

Specifically, that the first time period and the time period #A occupied by the first power saving signal may be associated with each other in this embodiment may be specified by a protocol or a system or configured by the network device. The terminal device and the network device can determine a time domain position of the first time period based on a time domain position of the time period #A. Then, the CSI-RS is sent/measured in the first time period.

The first time period may be configured by a network by using signaling, or may be specified by the protocol or the system. A unit of the first time period may be any one of a symbol (symbol), a slot (slot), a subframe (subframe), a frame (frame), a microsecond, a millisecond (ms), or a second.

For example, the first time period may be configured by the network by using RRC signaling or MAC CE signaling. For example, the network device configures a length t of the first time period to be 10 ms when configuring the first power saving signal.

For another example, the first time period may be specified by the system by default. For example, if a DRX cycle is greater than 80 ms, the length t of the first time period is equal to 10 ms. If the DRX cycle is less than or equal to 80 ms, the length t of the first time period is equal to 15 ms.

Optionally, duration of the first time period may be less than or equal to a second duration threshold. A time period in which the terminal device keeps an active state for performing measurement may be limited, to reduce power consumption of the terminal device.

Optionally, the duration of the first time period may be a length of on duration within the DRX cycle.

Figure 10:
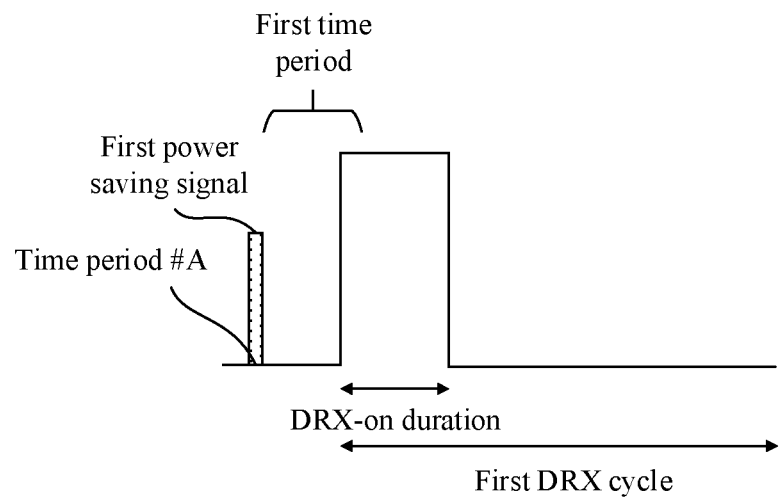
FIG. 10 is a schematic diagram of still another example of a setting manner of a first time period.

FIG. 10 is a schematic diagram of still another example of a setting manner of a first time period.

In FIG. 10, a length of the first time period may be equal to a length of on duration within a first DRX cycle.

Based on a similar understanding, to enable a terminal device to immediately perform RRM measurement after completing detection of a first power saving signal, and to reduce a time period in which the terminal device keeps awake, the first time period may be set close to a time period #A.

For example, in FIG. 10, the first time period may start from the first or the last symbol of the time period #A.

A CSI-RS configuration manner in the manner B is different from a CSI-RS configuration manner in the manner A. Specifically, the base station may not consider how the first power saving signal is configured, but may separately configure a periodic CSI-RS, provided that the CSI-RS is available within the first time period for the terminal device to perform RRM measurement.

Step 340: The terminal device sends an RRM measurement result to the network device.

Correspondingly, in the step 340, the network device receives the RRM measurement result sent by the terminal device.

Specifically, after completing measurement on the CSI-RS, the terminal device may report the RRM measurement result to the network device in time. In this way, the network device may perform an operation such as cell selection/reselection/handover on the terminal device based on the measurement result.

In this embodiment of this application, the associated first time period is determined based on the sending occasion of the first power saving signal. The network device sends the CSI-RS in the first time period, and the terminal device may perform RRM measurement on the CSI-RS in the first time period. This can ensure sufficient RRM measurement opportunities for the terminal device, ensure accuracy of RRM measurement, and prevent introduction of a concept "power saving signal" from affecting mobility RRM measurement performed by the terminal.

This application further provides a communication method 400, to provide a possibility that a network device and a terminal device do not send/measure a CSI-RS within a DRX cycle, to help reduce power consumption of the terminal device and the network device.

Figure 11:
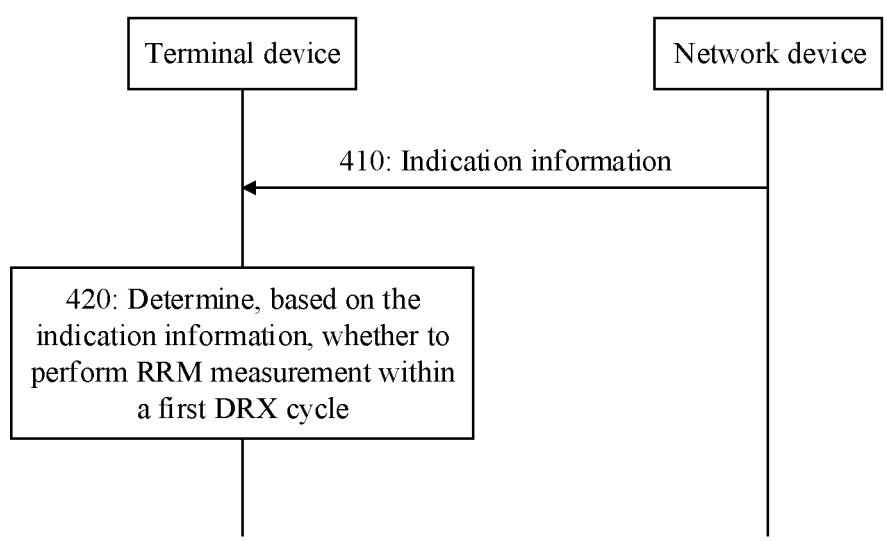
FIG. 11 is a schematic flowchart of still another example of a communication method according to this application.

FIG. 11 is a schematic flowchart of the communication method 400 according to an embodiment of this application. The method 400 shown in FIG. 11 includes steps 410 to 420.

Step 410: A terminal device receives indication information sent by a network device. The indication information includes first indication information and/or second indication information. The first indication information is used to indicate a possibility that the network device sends a CSI-RS within a first DRX cycle. The second indication information is used to indicate a possibility that the network device sends a CSI-RS within a second DRX cycle, and the second DRX cycle is a DRX cycle after the first DRX cycle.

Step 420: The terminal device determines, based on the indication information, whether to perform RRM measurement within the first DRX cycle.

Specifically, the first indication information is used to indicate the possibility that the network device sends the CSI-RS within the first DRX cycle, for example, may be used to indicate that the network device definitely or possibly sends the CSI-RS within the first DRX cycle. For example, that the network device definitely or possibly sends the CSI-RS within the first DRX cycle may be indicated by using one or more bits in a DCI field or by using different demodulation reference signal (demodulation reference signal, DMRS) scrambling code sequences.

Similarly, the second indication information is used to indicate the possibility that the network device sends the CSI-RS within the second DRX cycle, for example, may be used to indicate that the network device definitely or possibly sends the CSI-RS within the second DRX cycle. For example, that the network device definitely or possibly sends the CSI-RS within the second DRX cycle may be indicated by using one or more bits in the DCI field or by using different DMRS scrambling code sequences.

The terminal device may determine, based on the indication information, whether to perform RRM measurement within the first DRX cycle. In other words, the terminal device may determine, based on the possibility of sending the CSI-RS within the first DRX cycle and/or the possibility of sending the CSI-RS within the second DRX cycle, whether to perform RRM measurement within the current first DRX cycle.

Optionally, when it is determined that RRM measurement needs to be performed within the first DRX cycle, refer to the descriptions in the foregoing embodiments. RRM measurement may be performed in the first time period described in the foregoing embodiments. Details are not described herein again in this application.

In this embodiment of this application, whether to perform RRM measurement within the first DRX cycle can be determined based on the indication information. In this way, the terminal device can measure the CSI-RS more flexibly. The terminal device may determine, based on the indication information, whether to perform RRM measurement within the current first DRX cycle, for example, may determine, based on the indication information, not to perform RRM measurement within the first DRX cycle. This helps reduce energy consumption of the terminal device.

The following separately describes, based on different content included in the indication information, how the terminal device determines, based on the indication information, whether to perform RRM measurement within the first DRX cycle in the step 420.

Case 1

When the indication information includes the first indication information, in the step 420, that the terminal device determines, based on the indication information, whether to perform RRM measurement within the first DRX cycle includes:

if the first indication information indicates that the network device definitely sends the CSI-RS within the first DRX cycle, the terminal device performs RRM measurement within the first DRX cycle, where specifically, the first indication information indicates that the CSI-RS is definitely sent within the first DRX cycle, and because the terminal device cannot determine whether a CSI-RS is definitely available within a next DRX cycle, the terminal device may perform RRM measurement within the first DRX cycle; or if the first indication information indicates that the network device possibly sends the CSI-RS within the first DRX cycle, the terminal device may or may not perform RRM measurement within the first DRX cycle.

Case 2

When the indication information includes the second indication information, in the step 420, that the terminal device determines, based on the indication information, whether to perform RRM measurement within the first DRX cycle includes:

if the second indication information indicates that the network device definitely sends the CSI-RS within the second DRX cycle, the terminal device does not perform RRM measurement within the first DRX cycle; or if the second indication information indicates that the network device possibly sends the CSI-RS within the second DRX cycle, the terminal device performs RRM measurement within the first DRX cycle.

It is easy to understand that, if the second indication information indicates that the network device definitely sends the CSI-RS within the second DRX cycle, RRM measurement can be inevitably performed within the second DRX cycle. In this case, the terminal device may not perform RRM measurement within the first DRX cycle, to reduce power consumption.

If the second indication information indicates that the network device possibly sends the CSI-RS within the second DRX cycle, the terminal device cannot determine whether RRM measurement can be performed within the second DRX cycle. In this case, to ensure sufficient measurement samples, the terminal device performs RRM measurement within the first DRX cycle.

Optionally, the method 400 further includes:
the terminal device determines, based on a receiving status of a power saving signal, whether to detect a PDCCH within the first DRX cycle.

In the step 420, that the terminal device determines, based on the indication information, whether to perform RRM measurement within the first DRX cycle includes:
the terminal device determines, based on the indication information and whether to detect PDCCH within the first DRX cycle, whether to perform RRM measurement within the first DRX cycle.

Whether to detect PDCCH within the first DRX cycle may be determined based on the receiving status of the power saving signal. That the terminal device determines, based on the indication information and whether to detect PDCCH within the first DRX cycle, whether to perform RRM measurement within the first DRX cycle may be classified into the following several cases based on the different content included in the indication information.

Case 3

When the indication information includes the first indication information, that the terminal device determines, based on the indication information and whether to detect PDCCH within the first DRX cycle, whether to perform RRM measurement within the first DRX cycle includes:
if the first indication information indicates that the network device possibly sends the CSI-RS within the first DRX cycle, and the terminal device detects PDCCH within the first DRX cycle, the terminal device performs RRM measurement within the first DRX cycle; or
if the first indication information indicates that the network device possibly sends the CSI-RS within the first DRX cycle, and the terminal device does not detect PDCCH within the first DRX cycle, the terminal device does not perform RRM measurement within the first DRX cycle.

Specifically, when the terminal device detects PDCCH within the first DRX cycle, the terminal device inevitably needs to enter an active state. In this case, that the network device possibly sends the CSI-RS within the first DRX cycle, which is indicated by the first indication information, is changed to that the network device determines to send the CSI-RS. It may be understood that, when determining that the terminal device detects PDCCH within the first DRX cycle, the network device determines to send the CSI-RS within the first DRX cycle. In this case, an indication of the first indication information may be ignored. Therefore, the terminal device may alternatively perform RRM measurement within the first DRX cycle.

However, when the terminal device does not detect PDCCH within the first DRX cycle, the terminal device does not start a drx-on duration timer, and possibly enters an inactive state. In this case, the network device possibly sends the CSI-RS within the first DRX cycle only. For example, the first indication information is represented by one bit. When the bit is 0, it indicates that the CSI-RS is possibly sent. In this case, the network device may not send the CSI-RS within the first DRX cycle, and therefore the terminal device does not perform RRM measurement within the first DRX cycle. In addition, when the bit is 1, it indicates that the network device definitely sends the CSI-RS within the first DRX cycle. In this case, even if the terminal device does not detect PDCCH within the first DRX cycle, the terminal device may also perform RRM measurement within the first DRX cycle. Certainly, the terminal device may alternatively not perform RRM measurement within the first DRX cycle.

It may be understood that, if the network device determines that the terminal device detects PDCCH within the first DRX cycle, or the first indication information indicates that the network device definitely sends the CSI-RS within the first DRX cycle, the network device definitely sends the CSI-RS within the first DRX cycle. If the network device determines that the terminal device does not detect PDCCH within the first DRX cycle, and the first indication information indicates that the network device possibly sends the CSI-RS within the first DRX cycle, the network device may not send the CSI-RS within the first DRX cycle.

Case 4

When the indication information includes the second indication information, that the terminal device determines, based on the indication information and whether to detect PDCCH within the first DRX cycle, whether to perform RRM measurement within the first DRX cycle includes:
if the second indication information indicates that the network device possibly sends the CSI-RS within the second DRX cycle, and the terminal device detects PDCCH within the first DRX cycle, the terminal device performs RRM measurement within the first DRX cycle; or
if the second indication information indicates that the network device possibly sends the CSI-RS within the second DRX cycle, and the terminal device does not detect PDCCH within the first DRX cycle, the terminal device does not perform RRM measurement within the first DRX cycle.

Specifically, if the network device possibly sends the CSI-RS within the second DRX cycle, it cannot be determined whether the CSI-RS is sent within the second DRX cycle. If the terminal device detects PDCCH within the first DRX cycle, the terminal device needs to enter an active state, and the terminal device may perform RRM measurement within the first DRX cycle. If the terminal device does not detect PDCCH within the first DRX cycle, the terminal device does not start a drx-on duration timer. The terminal device determines, based on second indication information received last time, whether the network device sends the CSI-RS within the first DRX cycle. For example, when the second indication information is represented by using one bit, and the bit representing the second indication information received last time is 0, the network device may not send the CSI-RS within the first DRX cycle, and therefore the terminal device may not perform RRM measurement within the first DRX cycle. When the bit representing the second indication information received last time is 1, the terminal device determines that the network device sends the CSI-RS within the first DRX cycle, and therefore the terminal device may perform RRM measurement within the DRX cycle.

Case 5

When the indication information includes the first indication information and the second indication information, that the terminal device determines, based on the indication information and whether to detect PDCCH within the first DRX cycle, whether to perform RRM measurement within the first DRX cycle includes:
if the first indication information indicates that the network device possibly sends the CSI-RS within the first DRX cycle, the second indication information indicates that the network device possibly sends the CSI-RS within the second DRX cycle, and the terminal device does not detect PDCCH within the first DRX cycle, the terminal device determines that the network device may not send the CSI-RS within the first DRX cycle, and therefore the terminal device does not perform RRM measurement within the first DRX cycle;

if the first indication information indicates that the network device possibly sends the CSI-RS within the first DRX cycle, the second indication information indicates that the network device determines to send the CSI-RS within the second DRX cycle, and the terminal device does not detect PDCCH within the first DRX cycle, the terminal device determines that the network device may not send the CSI-RS within the first DRX cycle, and therefore the terminal device does not perform RRM measurement within the first DRX cycle;

if the first indication information indicates that the network device determines to send the CSI-RS within the first DRX cycle, the second indication information indicates that the network device possibly sends the CSI-RS within the second DRX cycle, and the terminal device does not detect PDCCH within the first DRX cycle, the terminal device may also perform RRM measurement within the first DRX cycle;

if the first indication information indicates that the network device possibly sends the CSI-RS within the first DRX cycle, the second indication information indicates that the network device possibly sends the CSI-RS within the second DRX cycle, and it is determined, based on the receiving status of the power saving signal, that the terminal device is waked up within the first DRX cycle, the terminal device determines that the network device sends the CSI-RS within the first DRX cycle, and therefore the terminal device may perform RRM measurement within the first DRX cycle;

if the first indication information indicates that the network device determines to send the CSI-RS within the first DRX cycle, the second indication information indicates that the network device determines to send the CSI-RS within the second DRX cycle, and it is determined, based on the receiving status of the power saving signal, that the terminal device does not detect PDCCH within the first DRX cycle, the terminal device may not perform RRM measurement within the first DRX cycle;

if the first indication information indicates that the network device possibly sends the CSI-RS within the first DRX cycle, the second indication information indicates that the network device determines to send the CSI-RS within the second DRX cycle, and it is determined, based on the receiving status of the power saving signal, that the terminal device detects PDCCH within the first DRX cycle, the terminal device determines that the network device sends the CSI-RS within the first DRX cycle, and therefore the terminal device may not perform RRM measurement within the first DRX cycle;

if the first indication information indicates that the network device determines to send the CSI-RS within the first DRX cycle, the second indication information indicates that the network device possibly sends the CSI-RS within the second DRX cycle, and it is determined, based on the receiving status of the power saving signal, that the terminal device detects PDCCH within the first DRX cycle, the terminal device may perform RRM measurement within the first DRX cycle; or if the first indication information indicates that the network device determines to send the CSI-RS within the first DRX cycle, the second indication information indicates that the network device determines to send the CSI-RS within the second DRX cycle, and it is determined, based on the receiving status of the power saving signal, that the terminal device detects PDCCH within the first DRX cycle, the terminal device may not perform RRM measurement within the first DRX cycle.

Optionally, the first indication information and the second indication information may be sent together to the terminal device, or may be sent separately.

For example, the first indication information, the second indication information, and the power saving signal are sent together to the terminal device.

For another example, the second indication information and the power saving signal are sent together to the terminal device.

Case 6

When the indication information includes the first indication information, that the terminal device determines, based on the indication information and whether to detect PDCCH within the first DRX cycle, whether to perform RRM measurement within the first DRX cycle includes:

the terminal device determines, based on the first indication information and whether to detect PDCCH within the first DRX cycle, the possibility that the network device sends the CSI-RS within the second DRX cycle; and the terminal device determines, based on the possibility that the network device sends the CSI-RS within the second DRX cycle, whether to perform RRM measurement within the first DRX cycle.

Specifically, the possibility that the network device sends the CSI-RS within the second DRX cycle may be determined based on the first indication information and whether to detect PDCCH within the first DRX cycle.

For example, the possibility that the network device sends the CSI-RS within the second DRX cycle may be determined according to the following protocol specifications:

If the first indication information indicates that the network device possibly sends the CSI-RS within the first DRX cycle, and the terminal device detects PDCCH within the first DRX cycle, the terminal device inevitably needs to enter an active state to detect PDCCH within the first DRX cycle. In this case, that the network device possibly sends the CSI-RS within the first DRX cycle, which is indicated by the first indication information, is changed to that the network device determines to send the CSI-RS. Therefore, the terminal device determines that the network device possibly sends the CSI-RS within the second DRX cycle.

If the first indication information indicates that the network device possibly sends the CSI-RS within the first DRX cycle, and the terminal device does not detect PDCCH within the first DRX cycle, because the terminal device does not need to detect PDCCH within the first DRX cycle, that the network device possibly sends the CSI-RS within the first DRX cycle, which is indicated by the first indication information, means that the network device may not send the CSI-RS. Therefore, the terminal device determines that the network device definitely sends the CSI-RS within the second DRX cycle.

If the first indication information indicates that the network device definitely sends the CSI-RS within the first DRX cycle, the terminal device determines that the network device possibly sends the CSI-RS within the second DRX cycle.

Further, the terminal device may determine, in the following manners based on the possibility that the network device sends the CSI-RS within the second DRX cycle, whether to perform RRM measurement within the first DRX cycle:

if the network device possibly sends the CSI-RS within the second DRX cycle, and it is determined that the terminal device detects PDCCH within the first DRX cycle, the terminal device performs RRM measurement within the first DRX cycle; or if the network device possibly sends the CSI-RS within the first DRX cycle, and it is determined that the terminal device does not detect PDCCH within the first DRX cycle, the terminal device does not perform RRM measurement within the first DRX cycle.

In this embodiment of this application, the indication information is used to indicate whether the network device sends the CSI-RS within the first DRX cycle and/or the second DRX cycle, and whether to perform RRM measurement within the first DRX cycle is determined based on the indication information (in combination with a specific indication of the power saving signal). In this way, the terminal device can measure the CSI-RS more flexibly, and the terminal device may determine, based on the indication information, whether to perform RRM measurement within the current first DRX cycle. This helps reduce the energy consumption of the terminal device.

This application further provides a communication method 500, to provide a possibility that a network device and a terminal device do not send/measure a CSI-RS within a DRX cycle, to help reduce power consumption of the terminal device and the network device.

Figure 12:
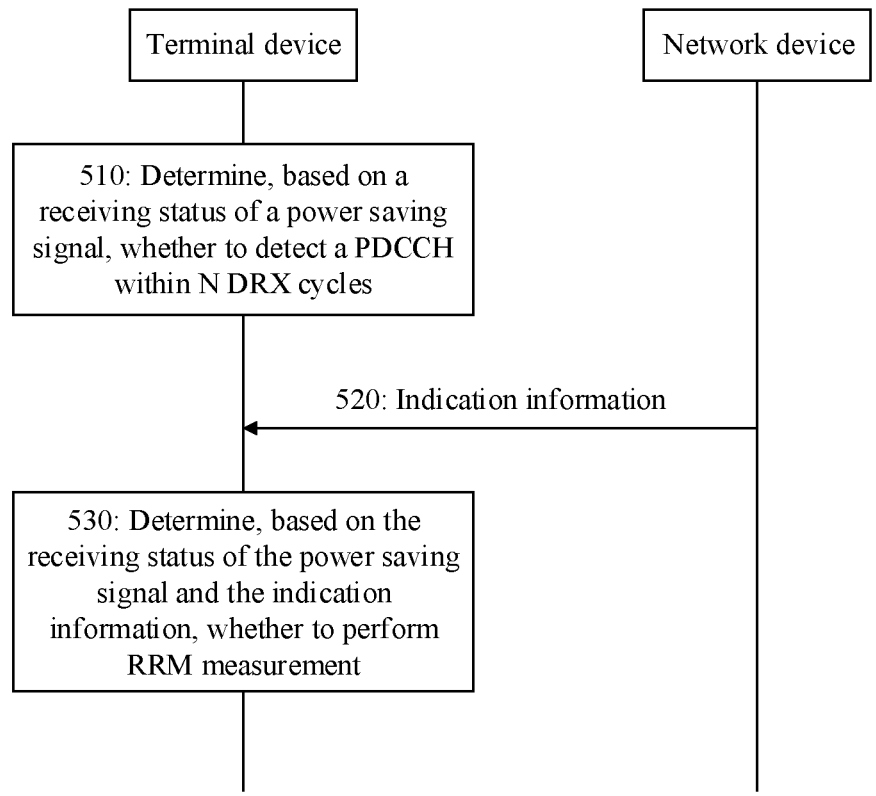
FIG. 12 is a schematic flowchart of still another example of a communication method according to this application.

FIG. 12 is a schematic flowchart of the communication method 500 according to an embodiment of this application. The method 500 shown in FIG. 12 includes steps 510 to 530.

Step 510: A terminal device determines, based on a receiving status of a power saving signal, whether to detect a PDCCH within N DRX cycles, where N is an integer greater than 1.

Step 520: The terminal device receives indication information, where the indication information is used to indicate whether a network device sends a CSI-RS within the N DRX cycles.

Step 530: The terminal device determines, based on the receiving status of the power saving signal and the indication information, whether to perform RRM measurement.

Specifically, the terminal device may determine, based on the receiving status of the power saving signal, not to detect PDCCH within each of the N DRX cycles, to detect PDCCH within each of the N DRX cycles, or to detect PDCCH within some of the N DRX cycles and not to detect PDCCH within some of the N DRX cycles.

The indication information may be used to indicate whether the network device sends the CSI-RS within the N DRX cycles. For example, the indication information may indicate that the CSI-RS is sent within each of the N DRX cycles, that the CSI-RS is not sent within each of the N DRX cycles, or that the CSI-RS is sent within some of the N DRX cycles and is not sent within some of the N DRX cycles.

Optionally, a bit "1" may be used to indicate that the CSI-RS is sent within a DRX cycle, and a bit "0" may be used to indicate that the CSI-RS is not sent within the DRX cycle. Based on this, a bit string including N bits may be used to indicate whether the network device sends the CSI-RS within the N DRX cycles.

For example, a value of N may be 5. In this case, a bit string "10101" indicates that the network device sends the CSI-RS within the indicated first, third, and fifth cycles and does not send the CSI-RS within the indicated second and fourth cycles.

The terminal device may determine, based on the receiving status of the power saving signal and the indication information, whether to perform RRM measurement within the N DRX cycles. For example, a specific cycle within which RRM measurement is performed and a specific cycle within which RRM measurement is not performed may be determined, to reduce power consumption of the terminal device while ensuring measurement accuracy.

The communication methods in the embodiments of this application are described above in detail with reference to FIG. 1 to FIG. 12. The following describes in detail apparatuses in the embodiments of this application with reference to FIG. 13 to FIG. 16. It should be understood that the apparatuses shown in FIG. 13 to FIG. 16 can implement one or more steps in the method procedures shown in FIG. 4, FIG. 8, FIG. 11, and FIG. 12. Details are not described herein again to avoid repetition.

Figure 13:
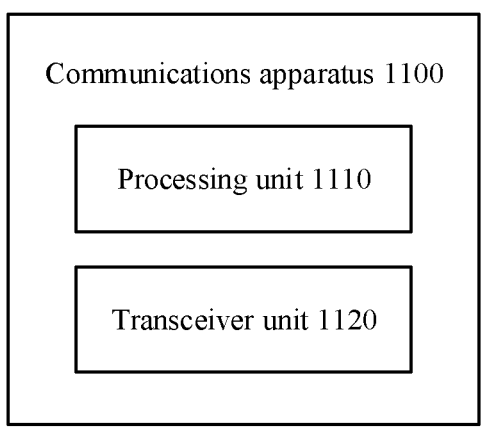
FIG. 13 is a schematic diagram of a communications device according to an embodiment of this application.

For example, a processing unit 1110 in a communications device 1100 shown in FIG. 13 may perform the step 220 in FIG. 4, and a transceiver unit 1120 may perform the steps 230 and 240 in FIG. 4. A processing unit 1310 in a communications apparatus 1300 shown in FIG. 15 may perform the step 210 in FIG. 4, and a transceiver unit 1320 may perform the steps 230 and 240 in FIG. 4.

FIG. 13 is a schematic diagram of a communications device according to an embodiment of this application. The communications device 1100 shown in FIG. 13 includes a processing unit 1110 and a transceiver unit 1120.

The processing unit 1110 is configured to determine, based on a receiving status of a first power saving signal, that not to detect PDCCH within a first DRX cycle.

The transceiver unit 1120 is configured to perform, in a first time period within the first DRX cycle, RRM measurement on a CSI-RS sent by a network device.

Optionally, the transceiver unit 1120 may be further configured to receive the first power saving signal.

Optionally, in an embodiment, the first time period includes a part or all of on duration within the first DRX cycle.

Optionally, in an embodiment, the first time period includes a part or all of an opportunity for DRX within the first DRX cycle.

In another embodiment, the processing unit 1110 is configured to determine the first time period based on a receiving occasion of the first power saving signal.

The transceiver unit 1120 is configured to perform, in the first time period, RRM measurement on the CSI-RS sent by the network device.

Optionally, in an embodiment, an offset value between a time period occupied by the CSI-RS and a time period occupied by the first power saving signal is less than or equal to a first duration threshold, and the time period occupied by the CSI-RS is in the first time period.

Optionally, in an embodiment, duration of the first time period is less than or equal to a second duration threshold.

In a possible implementation, the communications apparatus 1100 may be a terminal device 70. A function of the processing unit may be implemented by a processor 702 in the terminal device, and a function of the transceiver unit may be implemented by using a transceiver 701 (in other words, a control circuit and an antenna) in the terminal device. The following describes a structure of a terminal device in an embodiment of this application with reference to FIG. 14.

Figure 14:
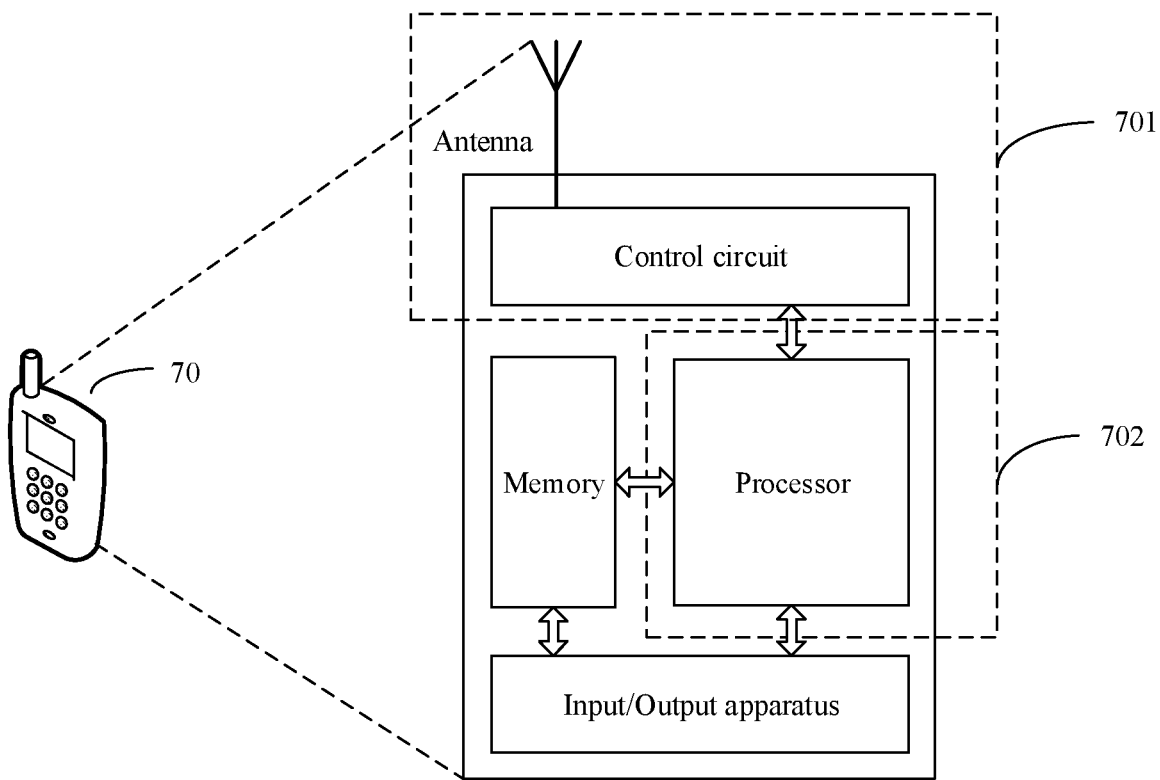
FIG. 14 is a schematic structural diagram of a terminal device according to an embodiment of this application.

FIG. 14 is a schematic structural diagram of a terminal device according to an embodiment of this application. The terminal device may be applicable to the system shown in FIG. 1, and perform a function of the terminal device in the foregoing method embodiments. For ease of description, FIG. 14 shows only main components of the terminal device. As shown in FIG. 14, the terminal device 70 includes a processor, a memory, a control circuit, an antenna, and an input/output apparatus. The processor is mainly configured to process a communications protocol and communication data, control the entire terminal device, execute a software program, and process data of the software program, for example, configured to support the terminal device to perform the actions described in the foregoing method embodiments. The memory is mainly configured to store the software program and data. The control circuit is mainly configured to: perform conversion between a baseband signal and a radio frequency signal, and process the radio frequency signal. The control circuit and the antenna may also be referred to as a transceiver, and are mainly configured to receive and send a radio frequency signal in an electromagnetic wave form. The input/output apparatus, such as a touchscreen, a display screen, or a keyboard, is mainly configured to receive data input by a user and output data to the user.

After the terminal device is powered on, the processor may read the software program in a storage unit, explain and execute instructions of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 14 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 14. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program, so that the processor executes the software program to implement a baseband processing function.

Figure 15:
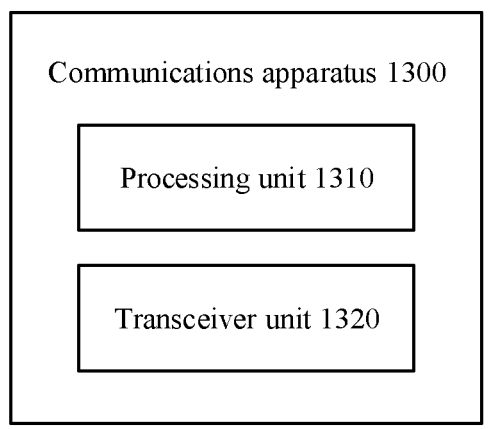
FIG. 15 is a schematic diagram of a communications device according to another embodiment of this application.

FIG. 15 is a schematic diagram of a communications device according to another embodiment of this application. The communications apparatus 1300 shown in FIG. 15 includes a processing unit 1310 and a transceiver unit 1320.

The processing unit 1310 is configured to determine that a terminal device does not detect a PDCCH within a first DRX cycle.

The transceiver unit 1320 is configured to send a CSI-RS to the terminal device in a first time period within the first DRX cycle, where the CSI-RS is used by the terminal device to perform RRM measurement.

Optionally, in an embodiment, the first time period includes a part or all of on duration within the first DRX cycle.

Optionally, in an embodiment, the first time period includes a part or all of an opportunity for DRX within the first DRX cycle.

In another embodiment, the processing unit 1310 is configured to determine the first time period based on a sending occasion of a first power saving signal.

The transceiver unit 1310 is configured to send the CSI-RS to the terminal device in the first time period, where the CSI-RS is used by the terminal device to perform RRM measurement.

Optionally, in an embodiment, an offset value between a time period occupied by the CSI-RS and a time period occupied by the first power saving signal is less than or equal to a first duration threshold, and the time period occupied by the CSI-RS is in the first time period.

Optionally, in an embodiment, duration of the first time period is less than or equal to a second duration threshold.

In a possible implementation, the communications apparatus 1300 may be a network device, for example, a base station 80 described below. A function of the processing unit may be implemented by a processor 8022 in the base station, and a function of the transceiver unit may be implemented by using an RRU 801 in the base station 80. The following describes a structure of a network device in an embodiment of this application with reference to FIG. 16.

Figure 16:
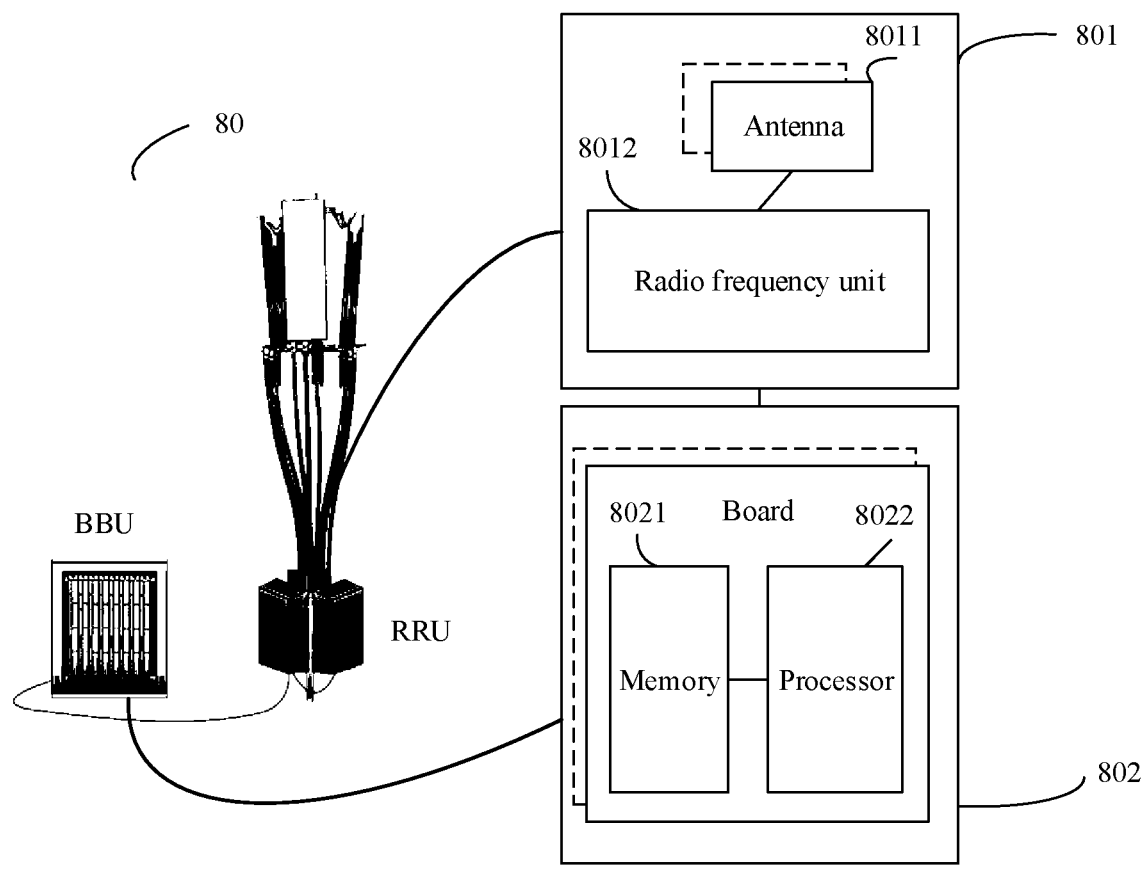
FIG. 16 is a schematic structural diagram of a network device according to an embodiment of this application.

FIG. 16 is a schematic structural diagram of a network device according to an embodiment of this application, for example, may be a schematic structural diagram of a base station. As shown in FIG. 16, the base station may be applied to the system shown in FIG. 1, and perform a function of the network device in the foregoing method embodiments. The base station 80 may include one or more radio frequency units such as a remote radio unit (remote radio unit, RRU) 801 and one or more baseband units (baseband unit, BBU) (which may also be referred to as a digital unit, digital unit, DU) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to: send and receive a radio frequency signal, and perform conversion between the radio frequency signal and a baseband signal, for example, configured to send the signaling message in the foregoing embodiments to a terminal device. The BBU 802 is mainly configured to: perform baseband processing, control the base station, and the like. The RRU 801 and the BBU 802 may be physically disposed together, or may be physically separated, that is, in a distributed base station.

The BBU 802, also referred to as a processing unit, is a control center of the base station, and is mainly configured to complete baseband processing functions such as channel coding, multiplexing, modulation, and spectrum spreading. For example, the BBU (the processing unit) 802 may be configured to control the base station to perform an operation procedure related to the network device in the foregoing method embodiments.

In an example, the BBU 802 may include one or more boards. A plurality of boards may jointly support a radio access network (such as an LTE network) of a single access standard, or may respectively support radio access networks (such as an LTE network, a 5G network, or another network) of different access standards. The BBU 802 further includes a memory 8021 and a processor 8022. The memory 8021 is configured to store necessary instructions and necessary data. For example, the memory 8021 stores a correspondence between a codebook index and a precoding matrix in the foregoing embodiments. The processor 8022 is configured to control the base station to perform a necessary action, for example, is configured to control the base station to perform the operation procedure related to the network device in the foregoing method embodiments. The memory 8021 and the processor 8022 may serve one or more boards. In other words, a memory and a processor may be disposed on each board. Alternatively, a plurality of boards may share a same memory and a same processor. In addition, a necessary circuit may be further disposed on each board.

This application further provides a communications system. The communications system includes the foregoing one or more network devices and one or more terminal devices.

It should be understood that the processor in the embodiments of this application may be a central processing unit (Central Processing Unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. As examples rather than limitative descriptions, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the methods provided in the embodiments of this application, this application further provides a computer program product. The computer program product includes computer program code. When the computer program code is run on a computer, the computer is enabled to perform the method in any one of the embodiments shown in FIG. 4. FIG. 8, FIG. 11, and FIG. 12.

According to the methods provided in the embodiments of this application, this application further provides a computer-readable medium. The computer-readable medium stores program code. When the program code is run on a computer, the computer is enabled to perform the method in any one of the embodiments shown in FIG. 4. FIG. 8, FIG. 11, and FIG. 12.

According to the methods provided in the embodiments of this application, this application further provides a system. The system includes the foregoing one or more terminal devices and one or more network devices.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions or computer programs. When the computer instructions or the computer programs are loaded or executed on a computer, the procedures or functions according to the embodiments of this application are all or partially generated. The computer may be a general-purpose computer, a dedicated-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

For ease of understanding, the following describes terms used in a process of describing the solutions in this application.

In the embodiments of this application, the "indication" may include a direct indication and an indirect indication, or may include an explicit indication and an implicit indication. Information indicated by a piece of information (configuration information described below) is referred to as to-be-indicated information. In a specific implementation process, the to-be-indicated information may be indicated in a plurality of manners, for example, but not limited to, in a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-beindicated information. Alternatively, only a part of the to-be-indicated information may be indicated, and another part of the to-be-indicated information is known or agreed on in advance. For example, specific information may be indicated by using a pre-determined (for example, stipulated in a protocol) arrangement sequence of various pieces of information, to reduce indication overheads to some extent.

In the embodiments of this application, the terms, acronyms, and abbreviations, such as discontinuous reception (DRX), the downlink control information (DCI), the media access control control element (MAC CE), radio resource control (RRC), the physical downlink control channel (PDCCH), the channel state information reference signal (CSI-RS), and the synchronization signal block (SSB), are all examples provided for ease of description, and should not constitute any limitation on this application. This application does not exclude a possibility of defining another term that can implement a same or similar function in an existing or a future protocol.

In the embodiments of this application, "first", "second", and various numbers are merely used for differentiation for ease of description, and are not used to limit the scope of the embodiments of this application, for example, are used to distinguish between different indication information or different DRX cycles.

In the embodiments of this application, the "communications protocol" may be a standard protocol in the communications field, for example, may include an LTE protocol, an NR protocol, and a related protocol applied to a future communications system. This is not limited in this application.

The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

Sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed systems, apparatuses, and methods may be implemented in other manners.

For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
sending a first downlink control information (DCI), wherein the first DCI comprises first indication information, the first indication information is a bit and the first indication information indicates a terminal device not to start an on duration timer and not to detect physical downlink control channel (PDCCH) within a first discontinuous reception (DRX) cycle; and
sending a channel state information reference signal (CSI-RS) or a synchronization signal/physical broadcast channel block (SSB) within the first DRX cycle, wherein a start position of the first time period is a start position of the first DRX cycle, wherein the first DRX cycle comprises a first time period, and the first time period corresponds to a time length configured for the on duration timer.

2. The method according to claim 1, wherein when duration of the first DRX cycle is less than 80 milliseconds, the first time period is the first DRX cycle.

3. The method according to claim 1, wherein the first DCI is sent in a preconfigured second time period that is before the first DRX cycle.

4. The method according to claim 1, further comprising:
sending a second DCI to the terminal device in a preconfigured fourth time period that is before a second DRX cycle, wherein second DCI comprises second indication information, the second indication information is a bit in the first second DCI and the second indication information indicates the terminal device to detect PDCCH within the second DRX cycle; and
sending a CSI-RS or SSB to the terminal device in a third time period within the second DRX cycle.

5. The method according to claim 4, wherein the third time period is an active time within the second DRX cycle.

6. The method according to claim 4, wherein when duration of the second DRX cycle is less than 80 milliseconds, the third time period is the second DRX cycle.

7. The method according to claim 1, wherein the CSI-RS or the SSB is for radio resource management (RRM) measurement of the terminal device.

8. A communications apparatus, comprising:
one or more processors in communications with a non-transitory memory storing computer instructions for execution by the one or more processors to cause the communications apparatus to:
send a first downlink control information (DCI), wherein the first DCI comprises first indication information, the first indication information is a bit and the first indication information indicates a terminal device not to start an on duration timer and not to detect physical downlink control channel (PDCCH) within a first discontinuous reception (DRX) cycle; and
send a channel state information reference signal (CSI-RS) or a synchronization signal/physical broadcast channel block (SSB) within the first DRX cycle, wherein the first DRX cycle comprises a first time period, a start position of the first time period is a start position of the first DRX cycle, and the first time period corresponds to a time length of the on duration timer.

9. The communications apparatus according to claim 8, wherein when duration of the first DRX cycle is less than 80 milliseconds, the first time period is the first DRX cycle.

10. The communications apparatus according to claim 8, wherein the first DCI is sent in a preconfigured second time period that is before the first DRX cycle.

11. The communications apparatus according to claim 8, wherein the instructions are for execution by the one or more processors to further cause the communications apparatus to:
send a second DCI to the terminal device in a preconfigured fourth time period that is before a second DRX cycle, wherein second DCI comprises second indication information, the second indication information is a bit and the second indication information indicates the terminal device to detect PDCCH within the second DRX cycle; and
send a CSI-RS or a SSB to the terminal device in a third time period within the second DRX cycle.

12. The communications apparatus according to claim 11, wherein the third time period is an active time within the second DRX cycle.

13. The communications apparatus according to claim 8, wherein the CSI-RS or the SSB is for radio resource management (RRM) measurement of the terminal device.

14. A non-transitory computer-readable storage medium comprising instructions which, when executed by a computer, cause the computer to perform operations comprising:
sending a first downlink control information (DCI), wherein the first DCI comprises first indication information, the first indication information is a bit and the first indication information indicates a terminal device not to start an on duration timer and not to detect physical downlink control channel (PDCCH) within a first discontinuous reception (DRX) cycle; and
sending a channel state information reference signal (CSI-RS) or a synchronization signal/physical broadcast channel block (SSB) within the first DRX cycle, wherein the first DRX cycle comprises a first time period, a start position of the first time period is a start position of the first DRX cycle, and the first time period corresponds to a time length configured for the on duration timer.

15. The non-transitory computer-readable storage medium according to claim 14, wherein when duration of the first DRX cycle is less than 80 milliseconds, the first time period is the first DRX cycle.

16. The non-transitory computer-readable storage medium according to claim 14, wherein the CSI-RS or the SSB is for radio resource management (RRM) measurement of the terminal device.

17. The non-transitory computer-readable storage medium according to claim 14, wherein the instructions which, when executed by a computer, further cause the computer to perform operations comprising:
sending a second DCI to the terminal device in a preconfigured fourth time period that is before a second DRX cycle, wherein second DCI comprises second indication information, the second indication information is a bit and the second indication information indicates the terminal device to detect PDCCH within the second DRX cycle; and
sending a CSI-RS or SSB to the terminal device in a third time period within the second DRX cycle.

* * * * *

UNITED STATES PATENT AND TRADEMARK OFFICE
CERTIFICATE OF CORRECTION

| | |
|---|---|
| PATENT NO. | : 12,185,412 B2 |
| APPLICATION NO. | : 17/884842 |
| DATED | : December 31, 2024 |
| INVENTOR(S) | : Zhanzhan Zhang, Xiaolei Tie and Han Zhou |

It is certified that error appears in the above-identified patent and that said Letters Patent is hereby corrected as shown below:

In the Claims

In Column 34, In Line 63, In Claim 1, after "wherein" insert -- the first DRX cycle comprises a first time period, --.

In Column 34, In Line 64-65, In Claim 1, after "cycle," delete "wherein the first DRX cycle comprises a first time period,".

In Column 35, In Line 12, In Claim 4, before "second DCI" delete "first".

Signed and Sealed this
Eighteenth Day of March, 2025

Coke Morgan Stewart
*Acting Director of the United States Patent and Trademark Office*